US00RE50408E

(19) United States
(12) Reissued Patent
Ko et al.

(10) Patent Number: US RE50,408 E
(45) Date of Reissued Patent: Apr. 29, 2025

(54) DATA STORAGE SYSTEM CONFIGURATION TO PERFORM DATA REBUILD OPERATION VIA REDUCED READ REQUESTS

(71) Applicant: SAMSUNG ELECTRONICS CO., LTD., Suwon-si (KR)

(72) Inventors: Min-Seok Ko, Seoul (KR); Hyun-Jung Shin, Yongin-si (KR); Jeong-Uk Kang, Bucheon-si (KR); Ji-Hyung Park, Yongin-si (KR)

(73) Assignee: SAMSUNG ELECTRONICS CO., LTD., Suwon-si (KR)

(21) Appl. No.: 17/470,041

(22) Filed: Sep. 9, 2021

Related U.S. Patent Documents

Reissue of:
(64) Patent No.: 10,409,683
Issued: Sep. 10, 2019
Appl. No.: 15/624,745
Filed: Jun. 16, 2017

(30) Foreign Application Priority Data

Oct. 25, 2016 (KR) ..... 10-2016-0139080

(51) Int. Cl.
*G06F 11/10* (2006.01)
*G06F 3/06* (2006.01)

(52) U.S. Cl.
CPC ..... *G06F 11/1092* (2013.01); *G06F 3/0619* (2013.01); *G06F 3/0665* (2013.01); *G06F 3/0689* (2013.01)

(58) Field of Classification Search
CPC .. G06F 11/1092; G06F 3/0619; G06F 3/0655; G06F 3/0689
See application file for complete search history.

(56) References Cited

U.S. PATENT DOCUMENTS

| | | | |
|---|---|---|---|
| 7,587,631 | B2 | 9/2009 | Shimmitsu |
| 7,631,218 | B2 | 12/2009 | Daikokuya et al. |
| 8,812,901 | B2 | 8/2014 | Sheffield, Jr. |
| 8,819,522 | B2 | 8/2014 | Baba |

(Continued)

FOREIGN PATENT DOCUMENTS

| | | | |
|---|---|---|---|
| JP | 2004062376 | A | 2/2004 |
| JP | 2007-334593 | A | 12/2007 |

(Continued)

OTHER PUBLICATIONS

Machine generated translation, JP-2014041524-A, Mar. 2014.*
Communication issued Dec. 3, 2024 by the Korean Patent Office for KR Patent Application No. 10-2016-0139080.

*Primary Examiner* — Eron J Sorrell
(74) *Attorney, Agent, or Firm* — Sughrue Mion, PLLC

(57) ABSTRACT

A data storage system configured to perform a data rebuild operation via a reduced number of read requests includes a host and a redundant array of independent disks (RAID) device including a plurality of data storage devices. When the host receives data of a first region and data of a second region of a read-requested region of each of the data storage devices in response to a rebuild request, the host receives failed address list information of the second region. The first region is a normal region, and the second region is a faulty region. The host rebuilds the data of the second region based on the failed address list information.

29 Claims, 18 Drawing Sheets

(56) References Cited

U.S. PATENT DOCUMENTS

| | | | | |
|---|---|---|---|---|
| 8,943,358 | B2 | 1/2015 | Ikeuchi et al. | |
| 9,015,434 | B2 | 4/2015 | Maeda et al. | |
| 9,323,630 | B2 | 4/2016 | Guyot et al. | |
| 9,842,024 | B1 * | 12/2017 | David | G06F 11/108 |
| 10,013,321 | B1 * | 7/2018 | Stern | G06F 11/2069 |
| 2006/0236149 | A1 * | 10/2006 | Nguyen | G06F 11/1088<br>714/6.12 |
| 2008/0256183 | A1 * | 10/2008 | Flynn | G06F 3/0613<br>709/204 |
| 2009/0113237 | A1 * | 4/2009 | Ito | G06F 11/1092<br>714/6.32 |
| 2011/0191629 | A1 * | 8/2011 | Daikokuya | G06F 11/2094<br>711/170 |
| 2013/0067275 | A1 * | 3/2013 | Watanabe | G06F 11/1092<br>714/6.24 |
| 2013/0339784 | A1 * | 12/2013 | Bickelman | G06F 11/1092<br>714/6.11 |
| 2015/0269025 | A1 * | 9/2015 | Krishnamurthy | G06F 11/1092<br>714/6.24 |
| 2015/0301895 | A1 * | 10/2015 | Dennett | G06F 11/1092<br>714/6.24 |
| 2016/0110255 | A1 | 4/2016 | Yun | |

FOREIGN PATENT DOCUMENTS

| | | | | |
|---|---|---|---|---|
| JP | 2010027140 | A | | 2/2010 |
| JP | 2014041524 | A | * | 3/2014 |
| JP | 5721344 | B2 | | 5/2015 |

* cited by examiner

DATA STORAGE SYSTEM CONFIGURATION TO PERFORM DATA REBUILD OPERATION VIA REDUCED READ REQUESTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

A claim of priority under 35 U.S.C. § 119 is made to Korean Patent Application No. 10-2016-0139080, filed on Oct. 25, 2016, in the Korean Intellectual Property Office, the entire contents of which are hereby incorporated by reference.

BACKGROUND

The inventive concept herein relates to data storage systems, and more particularly, to data storage systems using methods of transmitting failed addresses in order to reduce the number of read requests during a rebuild operation of a redundant array of independent disks (RAID).

RAID devices including a plurality of drives corresponding to hard disk drives (HDDs) or solid-state drives (SSDs), have been used to redundantly store data. In the event that one driver in a RAID device fails, the stored data may still be retained in other drives of the RAID device.

Upon failure of a drive in a RAID device, a RAID rebuild operation may be performed to exchange the failed drive in the RAID device with a new drive. In a RAID rebuild operation, a host may perform a data rebuild operation on the entire failed drive. In such a case, rebuild time may be lengthy.

On the other hand, in some RAID rebuild operations the host may perform a rebuild operation only on data in a failed portion of the failed drive. In this case, when the failed drive includes a plurality of failed portions, the failed drive may terminate a data read operation requested by the host whenever the failed drive accesses a failed logical block address (LBA) of the failed portion. The host may then issue a read request for a next LBA to the failed drive. However, if a number of failed LBAs in the failed drive is in a read request range set in the host, the host may issue several read requests because the failed drive interrupts read operations due to the failed LBAs.

SUMMARY

Embodiments of the inventive concept provide a method of rebuilding data, by which a failed address list is transmitted along with normal data of a read-requested region to a host in response to a rebuild request in order to reduce the number of read requests and reduce rebuild time.

Embodiments of the inventive concept also provide a redundant array of independent disks (RAID) group configured to support the method of rebuilding data.

Embodiments of the inventive concept provide a method of rebuilding data in a RAID device including a plurality of data storage devices. The method includes transmitting, by a host, a rebuild request to a failed data storage device from among the plurality of data storage devices; receiving, by the host, data of a first region and a second region of a read-requested region of the failed data storage device and information regarding the second region in response to the rebuild request, wherein the first region is a normal region and the second region is a faulty region; collecting, by the host, a failed address list of the failed data storage device; and rebuilding, by the host, the data of the second region based on the failed address list.

Embodiments of the inventive concept further provide a RAID device including a plurality of data storage devices. Each of the data storage devices includes memories that store data; and a memory controller configured to manage the data of the memories, read the data stored in the memories in response to an externally provided read request, and transmit the data externally. The memory controller is configured to transmit data of a first region and data of a second region of read-requested data related to an externally provided rebuild request, and transmit failed address list information of the second region. The first region is a normal region, and the second region is a faulty region.

Embodiments of the inventive concept still further provide a data storage system that includes a redundant array of independent disks (RAID) device including a plurality of data storage devices that store data; and a host configured to receive data of a first region and a second region of a read-requested region of a failed data storage device from among the plurality of data storage devices, collect a failed address list of the failed data storage device, and rebuild the data of the second region based on the failed address list. The first region is a normal region, and the second region is a faulty region.

BRIEF DESCRIPTION OF THE DRAWINGS

Embodiments of the inventive concept will be more clearly understood from the following detailed description taken in conjunction with the accompanying drawings in which.

DETAILED DESCRIPTION

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
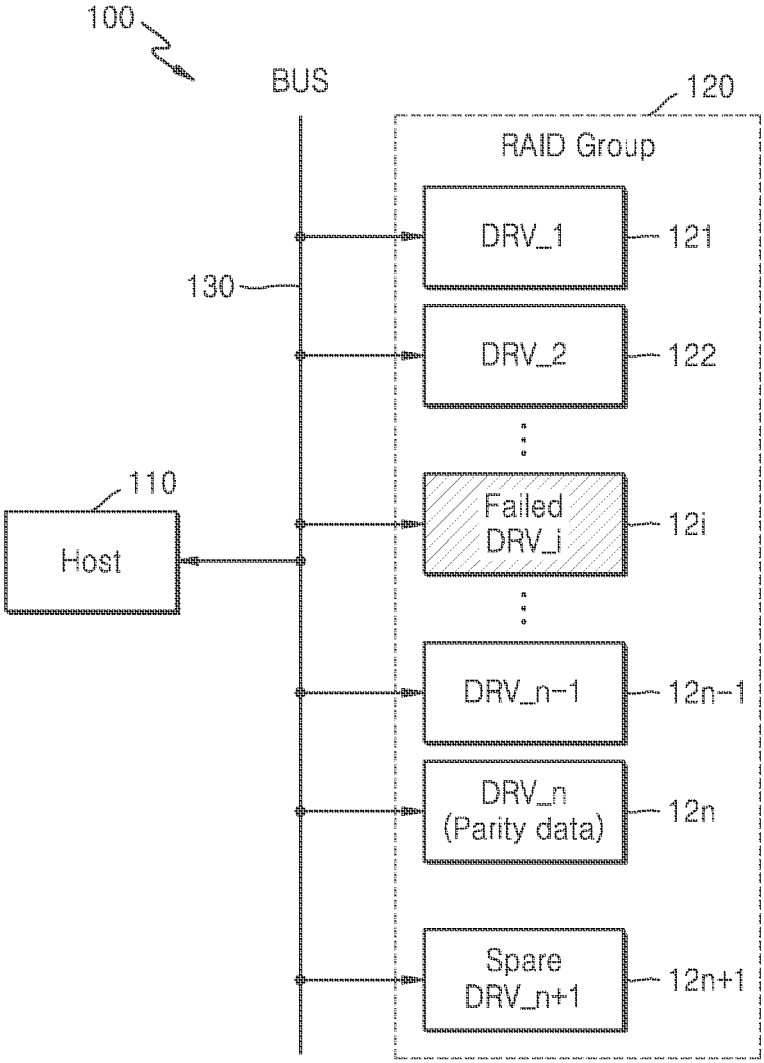
FIG. 1 illustrates a diagram of a data storage system according to an embodiment of the inventive concept.

FIG. 1 illustrates a diagram of a data storage system 100 according to an embodiment of the inventive concept.

Referring to FIG. 1, the data storage system 100 includes a host 110 and a redundant array of independent disks (RAID) group 120. The data storage system 100 may be included in computers and network systems, such as personal computers (PCs), workstations, server systems, and cloud storage systems. The data storage system 100 may be used to store data and retrieve the stored data.

The host 110 may communicate with the RAID group 120 through a bus 130. The bus 130 may be at least one separated link connected between components of the data storage system 100.

For example, the bus 130 may include various interfaces, such as for example a serial advanced technology attachment (SATA), a serial attached small computer system (SAS), a small computer system interface (SCSI), an advanced technology attachment (ATA), peripheral component interconnect express (PCIe), integrated drive electronics (IDE), direct media interface (DMI), universal serial bus (USB), or a wireless interface, among others.

The data storage system 100 may include a multiple RAID group 120 having one of various arrangements to obtain reliability and validity. In the present embodiment, a method of managing data of the RAID group 120 in the data storage system 100 by using a RAID scheme is used to ensure data reliability. The data storage system 100 may be embodied by a multiple RAID device including a plurality of RAID groups (not shown) in addition to the RAID group 120, each of which includes a plurality of data storage devices 121 to 12n+1 as shown in RAID group 120. For brevity, it is assumed herein that the RAID group 120 constitutes one data storage system 100.

The host 110 may perform a top-level data management control operation on the data storage devices 121 to 12n+1 included in the RAID group 120.

The RAID group 120 may indicate a single RAID group and include a plurality of data storage devices DRV_1 to DRV_n and DRV_n+1. For example, the data storage devices DRV_1 to DRV_n may include hard disk drives (HDDs), solid-state drives (SSDs), optical drives, or tape drives, among other types of drives.

The RAID group 120 may store data in or retrieve data from the first to n−1-th data storage devices 121 to 12n−1 according to a RAID scheme, and store RAID parity data in the n-th data storage device 12n. For example, data stored in the first to n−1-th data storage devices 121 to 12n−1 may be user data, system data, and/or swap file data.

The RAID parity data stored in the n-th data storage device 12n may be result values obtained by performing an exclusive OR (XOR) operation on the data stored in the first to n−1-th data storage devices 121 to 12n−1. The RAID parity data stored in the n-th data storage device 12n may be provided to ensure reliability of data stored in the RAID group 120.

In the RAID group 120, any one of the first to n−1-th data storage devices 121 to 12n−1 may be in a state of failure or indicate a failure. For example, it may be assumed for purposes of illustration that an i-th data storage device 12i is a failed data storage device (i.e., in a state of failure). If the failed data storage device 12i is still accessible, data stored in the failed data storage device 12i may be transmitted to a spare data storage device 12n+1 that is previously allocated to the RAID group 120. The host 110 may rebuild the data stored in the failed data storage device 12i and store the rebuilt data in the spare data storage device 12n+1. Thus, the failed data storage device 12i may be exchanged with the spare data storage device 12n+1.

The host 110 may copy normal data of fault regions of the failed data storage device 12i, store the copied normal data in the spare data storage device 12n+1, perform a data rebuild operation only on data of a failed portion of the failed data storage device 12i, and store rebuilt data in the spare data storage device 12n+1. Due to the data rebuild operation, the data of the failed portion may be replaced by rebuilt data obtained by performing an XOR operation after reading data from the corresponding regions of the remaining data storage devices other than the failed data storage device 12i from among the first to n-th data storage devices 121 to 12n.

The host 110 may detect a failure related to the data storage devices 121 to 12n−1 included in the RAID group 120 and perform a data rebuild operation responsive to the detected failure. If the failure is detected, the host 110 may issue a rebuild request Rebuild REQ to the data storage devices 121 to 12n−1 to retain the data stored in the RAID group 120. Also, the host 110 may issue a read request Read Request related to the rebuild request Rebuild REQ to the data storage devices 121 to 12n−1. The host 110 may receive read requested data from the data storage devices 121 to 12n−1. In this case, the host 110 may receive read requested data including failed address information from the RAID group 120. The host 110 may rebuild data of a faulty region from the read requested data based on the received failed address information.

Figure 2:
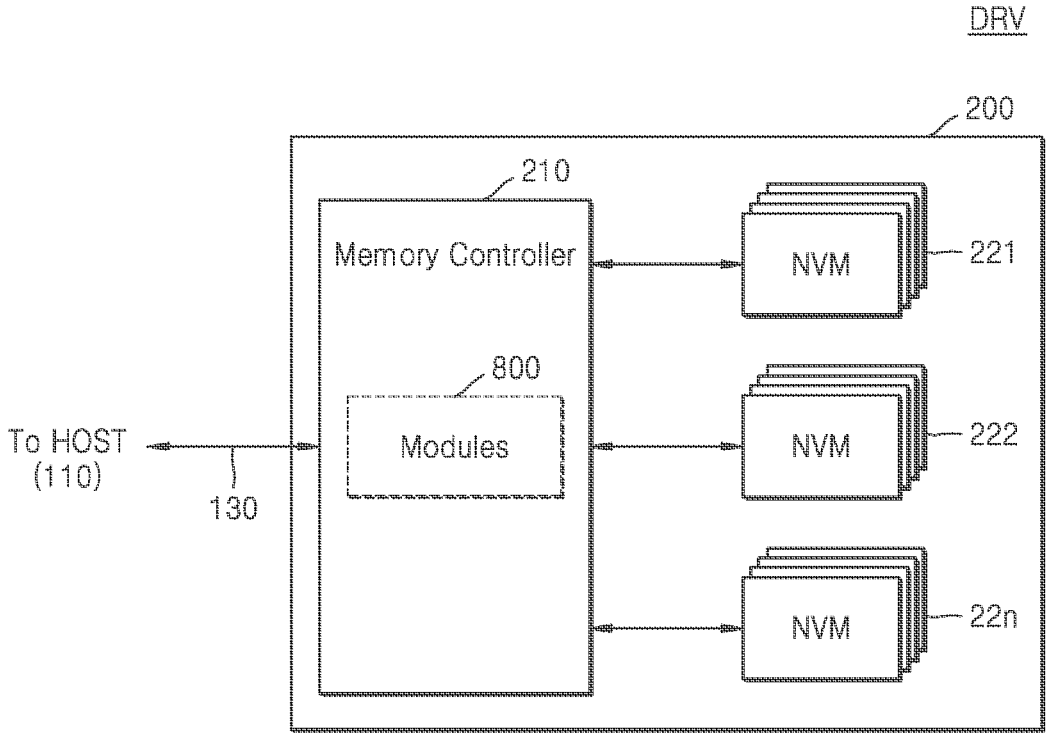
FIG. 2 illustrates a block diagram of a data storage device included in a redundant array of independent disks (RAID) group of FIG. 1, according to an embodiment of the inventive concept.

FIG. 2 illustrates a block diagram of a data storage device included in the redundant array of independent disks (RAID) group of FIG. 1, according to an embodiment of the inventive concept.

Referring to FIG. 2, a data storage device DRV may include an SSD 200. The SSD 200 may communicate with a host 110 (shown in FIG. 1) via a bus 130. The SSD 200 includes a memory controller 210 and a plurality of memories 221 to 22n. For example, the memories 221 to 22n may be flash memories. Hereinafter, the memories 221 to 22n will be referred to as flash memories 221 to 22n.

The memory controller 210 may control the plurality of flash memories 221 to 22n in response to a signal received from the host 110. The memory controller 210 may read data stored in the flash memories 221 to 22n and transmit the data to the host 110 in response to a read request (or command) signal received from the host 110. The memory controller 210 may store data transmitted from the host 110 in the flash memories 221 to 22n in response to a write request (or command) signal received from the host 110. The memory controller 210 may exchange commands and data with the host 110 through an interface provided in the host.

The memory controller 210 may provide logical block addresses (LBAs) of the flash memories 221 to 22n to the host 110, and provide physical block addresses (PBAs) to the flash memories 221 to 22n. The memory controller 210 may manage the flash memories 221 to 22n by using the PBAs, and convert the PBAs into LBAs.

The memory controller 210 may include modules 800 for supporting a data rebuild operation performed by the host 110. The modules 800 included in the memory controller 210 will be described in detail later with reference to FIG. 8. For example, the modules 800 may determine whether to support a data rebuild operation, determine whether a failed address is included in data read in response to the read request, divide the read data into normal regions (which are faultless regions) and a faulty region, and transmit read-requested data including data of the normal regions and failed address information regarding the faulty region to the host 110.

Figure 3:
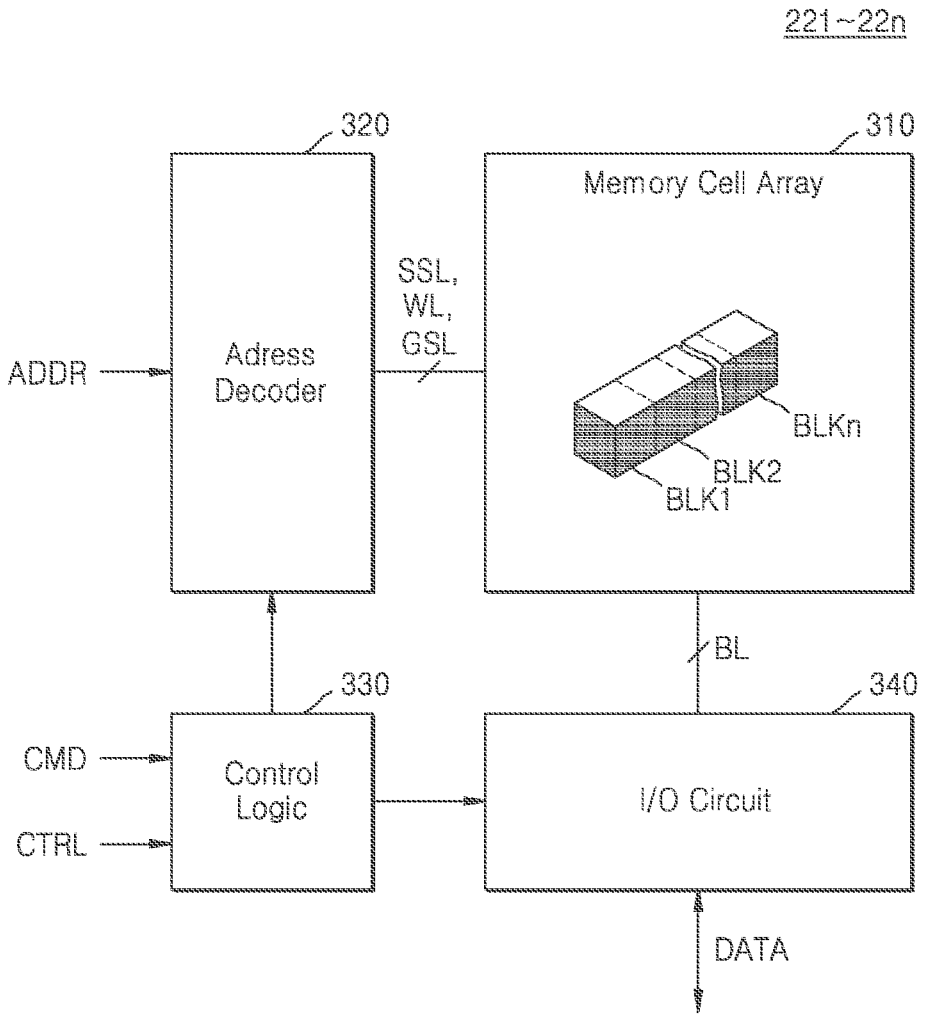
FIG. 3 illustrates a block diagram of a nonvolatile memory included in the data storage device of FIG. 2, according to an embodiment of the inventive concept.

FIG. 3 illustrates a block diagram of a nonvolatile memory (flash memory) included in the data storage device of FIG. 2, according to an embodiment of the inventive concept. The flash memories 221 to 22n will be described with reference to the block diagram of FIG. 3.

Referring to FIG. 3, the flash memories 221 to 22n each include a memory cell array 310, an address decoder 320, control logic 330, and an I/O circuit 340.

The memory cell array 310 may be connected to word lines WL, string selection lines SSL, ground selection lines GSL, and bit lines BL. The memory cell array 310 may be connected to the address decoder 320 through the word lines WL, the string selection lines SSL, and the ground selection lines GSL, and connected to the I/O circuit 340 through the bit lines BL. The memory cell array 310 may include a plurality of memory blocks BLK1 to BLKn.

Each of the memory blocks BLK1 to BLKn may include a plurality of memory cells and a plurality of selection transistors. The memory cells may be connected to the word lines WL, and the selection transistors may be connected to the string selection lines SSL or the ground selection lines GSL. The memory cells of each of the memory blocks BLK1 to BLKn may include single-level cells configured to store 1-bit data or multi-level cells configured to store multi-bit data. The memory cells of each of the memory blocks BLK1 to BLKn may be stacked in a direction perpendicular to a substrate and form a three-dimensional (3D) structure. A structure of each of the memory blocks BLK1 to BLKn will be described in detail with reference to FIGS. 4 and 5.

The address decoder 320 may be configured to perform selection and driving operations on the word lines WL of the memory cell array 310. The address decoder 320 may receive addresses ADDR from the memory controller (refer to 210 in FIG. 2), decode the addresses ADDR, and drive a plurality of word lines WL.

The control logic 330 may receive a command CMD and a control signal CTRL from the memory controller 210, and control the address decoder 320 and the I/O circuit 340 in response to the command CMD and the control signal CTRL. For example, the control logic 330 may control the address decoder 320 and the I/O circuit 340 to write data DATA to the memory cell array 310 in response to the command CMD and the control signal CTRL. The control logic 330 may control the address decoder 320 and the I/O circuit 340 to output (read) data DATA stored in the memory cell array 310 in response to the command CMD and the control signal CTRL. The control logic 330 may control the address decoder 320 and the I/O circuit 340 to erase data stored in a portion of the memory cell array 310 in response to the command CMD and the control signal CTRL.

The control logic 330 may control a voltage generator (not shown) configured to generate various voltages required to operate the flash memories 221 to 22n. For example, the voltage generator may generate various voltages, such as for example a plurality of selected read voltages, a plurality of unselected read voltages, a plurality of program voltages, a plurality of pass voltages, and a plurality of erase voltages, and provide the generated voltages to the address decoder 320 and the memory cell array 310.

The I/O circuit 340 may be connected to the memory cell array 310 through a plurality of bit lines BL. The I/O circuit 340 may control the plurality of bit lines BL to write data DATA received from the memory controller 210 to the memory cell array 310. The I/O circuit 340 may control the plurality of bit lines BL to output data DATA stored in the memory cell array 310.

Figure 4:
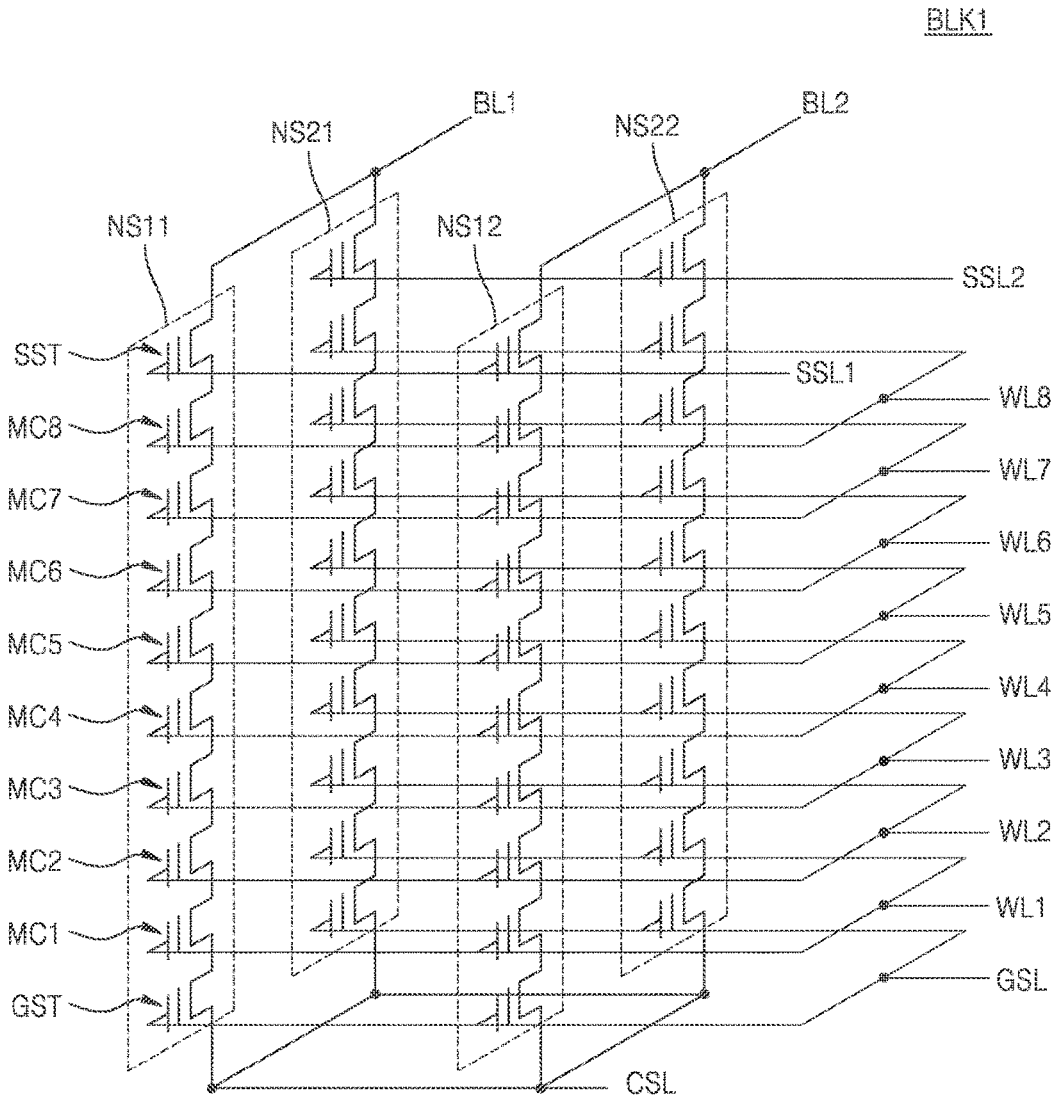
FIG. 4 illustrates a circuit diagram of a block BLK1 of the memory cell array of FIG. 3, according to an embodiment of the inventive concept.

FIG. 4 illustrates a circuit diagram of block BLK1 of the memory cell array of FIG. 3, according to an embodiment of the inventive concept. Although FIG. 4 illustrates a portion of the first memory block BLK1 of the memory blocks BLK1 to BLKn shown in FIG. 3, the inventive concept is not limited thereto. Each of the other memory blocks BLK2 to BLKn may have the same structure as the first memory block BLK1.

The first memory block BLK1 may include a plurality of NAND strings (e.g., NS11 to NS22), a plurality of word lines (e.g., WL1 to WL8), a plurality of bit lines (e.g., first and second bit lines BL1 and BL2), a ground selection line GSL, string selection lines SSL1 and SSL2 (which may hereinafter be collectively referred to as string selection lines SSL), and a common source line CSL. Here, the number of NAND strings, the number of word lines, the number of bit lines, the number of ground selection lines, and the number of string selection lines may be variously changed according to embodiments.

NAND strings NS11 and NS21 may be provided between the first bit line BL1 and the common source line CSL, and NAND strings NS12 and NS22 may be provided between the second bit line BL2 and the common source line CSL. Each of the NAND strings (e.g., the NAND string NS11) may include a string selection transistor SST, a plurality of memory cells (e.g., MC1 to MC8), and a ground selection transistor GST, which are connected in series.

NAND strings connected in common to one bit line may constitute one column. For example, NAND strings NS11 and NS21 connected in common to the first bit line BL1 may correspond to a first column, and NAND strings NS12 and NS22 connected in common to the second bit line BL2 may correspond to a second column.

NAND strings connected to one string selection line may constitute one row. For example, NAND strings NS11 and NS12 connected to a first string selection line SSL1 may correspond to a first row, and NAND strings NS21 and NS22 connected to a second string selection line SSL2 may correspond to a second row.

The string selection transistors SST of the NAND strings may be connected to the first and second string selection lines SSL1 and SSL2 corresponding thereto. The plurality of memory cells MC1 to MC8 may be respectively connected to the word lines WL1 to WL8 corresponding thereto. The ground selection transistor GST may be connected to the ground selection line GSL corresponding thereto. The string selection transistors SST of the NAND strings may be connected to the first and second bit lines BL1 and BL2 corresponding thereto, and the ground selection transistors GST of the NAND strings may be connected to the common source line CSL.

In the present embodiment, word lines (e.g., WL1) located at the same level may be connected in common to one another. For example, when memory cells connected to the first word line WL1 and included in the NAND strings NS11 and NS12 are programmed, a first word line WL1 and a first string selection line SSL1 may be selected.

The number of columns of NAND strings may increase or decrease. When the number of columns of NAND strings is changed, the number of bit lines connected to columns of the NAND strings and the number of NAND strings connected to one string selection line may also be changed.

The height of the NAND strings may increase or decrease. For example, the number of memory cells stacked in each of the NAND strings may increase or decrease. When the number of memory cells stacked in each of the NAND strings is changed, the number of word lines may also be changed. For example, the number of string selection transistors or ground selection transistors provided in each of the NAND strings may increase. When the number of the string selection transistors or the ground selection transistors provided in each of the NAND strings is changed, the number of string selection lines or ground selection lines may also be changed. When the number of the string selection transistors or the ground selection transistors increases, the string selection transistors or the ground selection transistors may be stacked in the same shape as the memory cells MC1 to MC8.

For example, program and read operations may be performed by row units of NAND strings NS11, NS12, NS21, and NS22. The NAND strings NS11, NS12, NS21, and NS22 may be selected by a unit of one row by the string selection lines SSL1 and SSL2. The NAND strings NS11 and NS12 may be selected by a unit of one row by the first string selection line SSL1, while the NAND strings NS21 and NS22 may be selected by a unit of one row by the second string selection line SSL2.

In a selected row of the NAND strings NS11, NS12, NS21, and NS22, program and read operations may be performed by page units. A page may be one row of memory cells connected to one word line. In a selected row of the NAND strings NS11, NS12, NS21, and NS22, memory cells may be selected by page units by the word lines WL1 to WL8.

Figure 5:
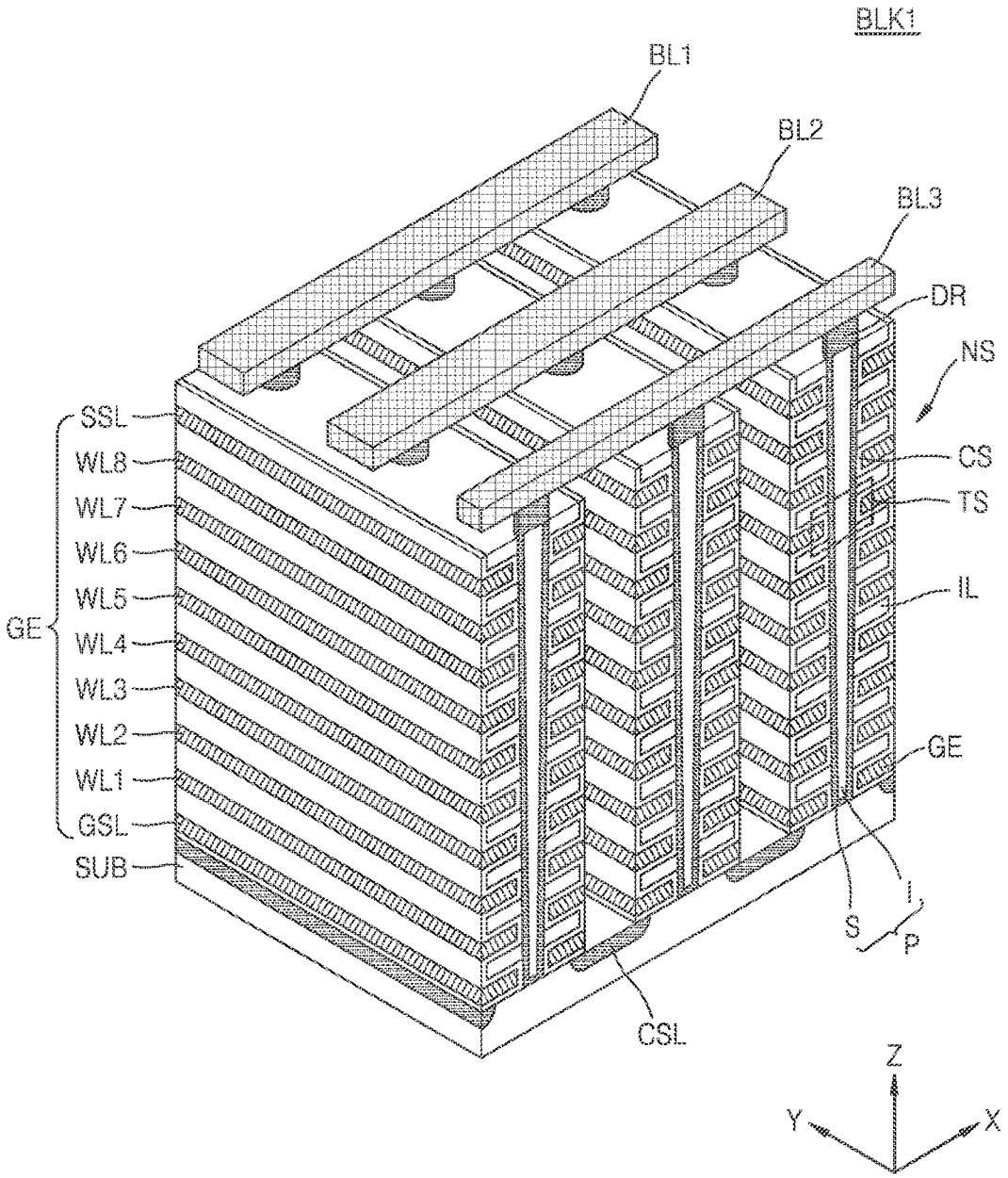
FIG. 5 illustrates a perspective view of the block BLK1 of the memory cell array of FIG. 4, according to an embodiment of the inventive concept.

FIG. 5 illustrates a perspective view of the block BLK1 of the memory cell array of FIG. 4, according to an embodiment of the inventive concept.

Referring to FIG. 5, the memory block BLK1 may be provided as a structure including memory cells disposed one over another in a vertical direction (i.e., a Z direction) from a substrate SUB. Although FIG. 5 illustrates an example in which the memory block BLK1 includes two selection lines GSL and SSL, eight word lines WL1 to WL8, and three bit lines BL1 to BL3, the memory block BLK1 may actually include more or fewer selection lines, word lines, and bit lines than those described above.

The substrate SUB may have a first conductivity type (e.g., a p type). A common source line CSL may be provided on the substrate SUB and extend in a first direction (i.e., Y direction). The common source line CSL may be doped with impurities of a second conductivity type (e.g., an n type). A plurality of insulating films IL may be provided on a region of the substrate SUB between two adjacent common source lines CSL and extend in the first direction. The plurality of insulating films IL may be sequentially provided and spaced a predetermined distance apart from one another in a third direction (i.e., a Z direction). For example, the plurality of insulating films IL may include an insulating material, such as silicon oxide.

A plurality of pillars P may be provided on a region of the substrate SUB between two adjacent common source lines CSL and sequentially arranged in the first direction. The plurality of pillars P may penetrate the plurality of insulating films IL in the third direction. For example, the plurality of pillars P may penetrate the plurality of insulating films IL and contact the substrate SUB. Specifically, a surface layer S of each of the pillars P may include a p-type silicon material and function as a channel region. Meanwhile, an inner layer I of each of the pillars P may include an insulating material (e.g., silicon oxide) or an air gap.

A charge storage layer CS may be provided along exposed surfaces of the insulating films IL, the pillars P, and the substrate SUB between two adjacent common source lines CSL. The charge storage layer CS may include a gate insulating layer (which may be referred to as a 'tunnelling insulating layer'), a charge trap layer, and a blocking insulating layer. For example, the charge storage layer CS may have an oxide-nitride-oxide (ONO) structure. Also, gate electrodes GE, such as the selection lines GSL and SSL and the word lines WL1 to WL8, may be provided on exposed surfaces CS in a region between two adjacent common source lines CSL.

Drains or drain contacts DR may be provided on the plurality of pillars P, respectively. For example, the drains or drain contacts DR may include a silicon material doped with impurities having a second conductivity type. Bit lines BL1 to BL3 may be provided on the drains DR. The bit lines BL1 to BL3 may extend in a second direction (i.e., an X direction) and be spaced a predetermined distance apart from one another in the first direction.

Each of the pillars P may constitute a NAND string NS along with the insulating film IL and the selection lines CSL and SSL and the word lines WL1 to WL8, which may extend in the third direction. The NAND string NS may include a plurality of transistor structures TS, each of which may include a charge trap flash (CTF) memory cell.

However, after the CTF memory cell of the memory block BLK1 is programmed, charges stored in the charge storage layer CS may be emitted as time passes by. Also, when the number of times the CTF memory cell repeats program and erase operations increases, the tunnelling insulating layer may be degraded to worsen charge loss.

Due to the above-described phenomena, errors may occur in data stored in memory cells of the flash memories 221 to 22n, and failed memory cells may be generated. If the memory blocks BLK1 to BLKn including failed memory cells are accessed or retrieved in the flash memories 221 to 22n, a data storage device such as data storage device 12i (DRVi in FIG. 1) may be determined as a failed data storage device.

The present embodiments provide a method of rebuilding data of the failed data storage device DRVi in the RAID group (refer to 120 in FIG. 1) to ensure data reliability in the data storage system (refer to 100 in FIG. 1). Also, during a data rebuild operation, a failed address list may be transmitted to a host along with normal data of a read-requested region so that the number of read requests may be reduced and data may be rebuilt rapidly.

Figure 6:
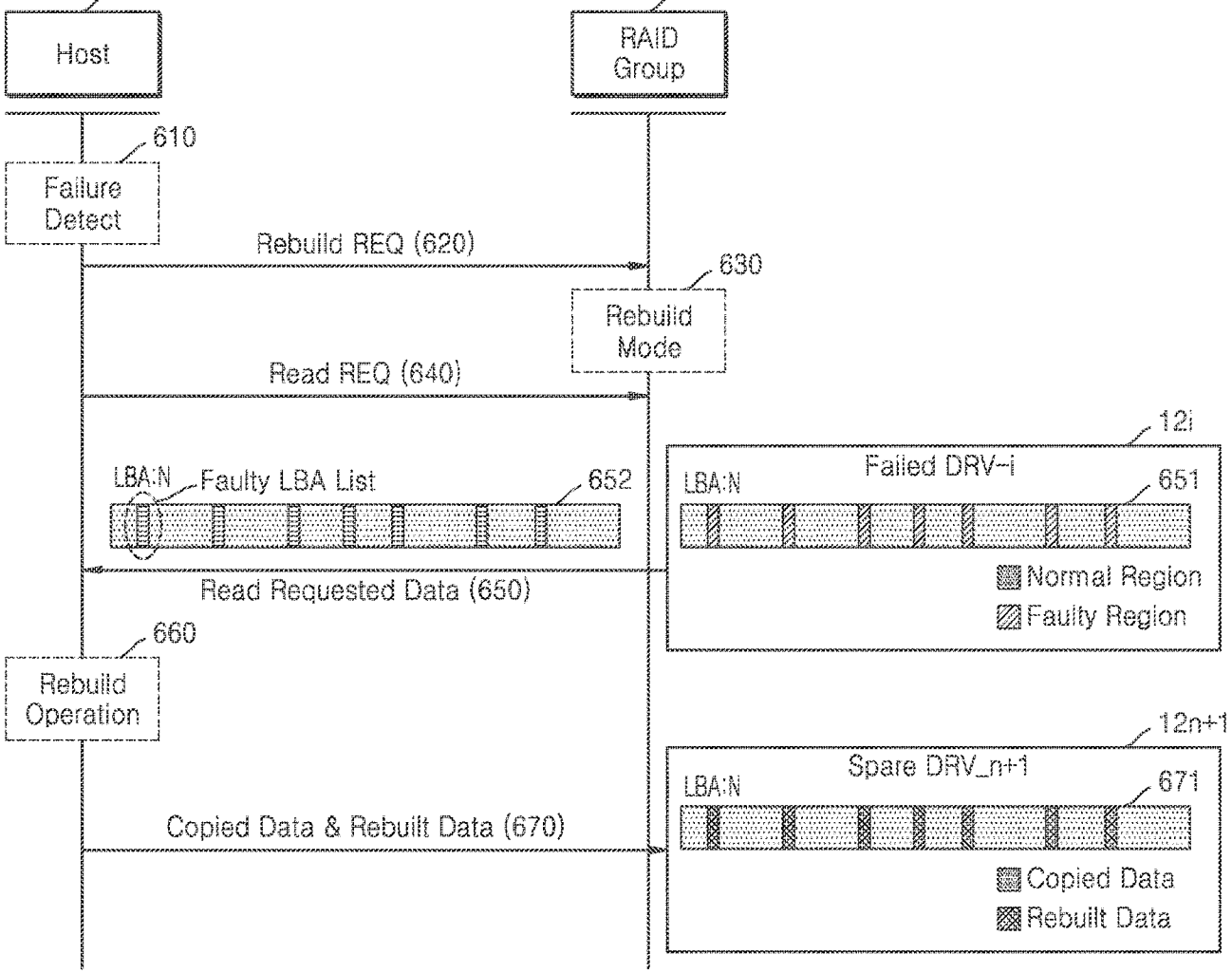
FIG. 6 illustrates a diagram explanatory of a method of rebuilding data, which is performed by a data storage system, according to an embodiment of the inventive concept.

FIG. 6 illustrates a diagram explanatory of a data rebuild operation performed by the data storage system of FIG. 1, according to an embodiment of the inventive concept.

Referring to FIGS. 1 and 6, the host 110 may communicate with the data storage devices 121 to 12n−1 to store data in the RAID group 120 or retrieve data from the RAID group 120. During the communication process, any one of the data storage devices 121 to 12n−1 in the RAID group 120 may be in a state of failure or indicate failure signs. For example, for the purposes of illustration, in the following description it is assumed that an i-th data storage device 12i is a failed data storage device as indicated in FIG. 1.

The host 110 may detect a failure related to the data storage devices 121 to 12n−1 included in the RAID group 120 (operation 610). The host 110 may use logical block addresses (hereinafter, referred to as 'LBAs') to access the data storage devices 121 to 12n−1. The data storage devices 121 to 12n−1 may include mapping information including physical block addresses (hereinafter, referred to as 'PBAs') corresponding to the LBAs, and may access data of the PBAs mapped with the LBAs.

For example, the data of the mapped PBAs may be bad data in the data storage device 12i that is accessed by the host 110 using the LBAs. In this case, the host 110 may detect the failed data storage device 12i as a failure (i.e., in a state of failure).

The host 110 may issue a rebuild request Rebuild REQ to the failed data storage device 12i to retain data stored in the RAID group 120 (operation 620). Although the rebuild request Rebuild REQ used in the present embodiment may be variously provided as a rebuild command or a rebuild signal for example, the inventive concept should not limited thereto and issuing of the rebuild request Rebuild REQ may be provided in various other manners. Also, it should be understood that the term 'issuing' used in the present embodiment may be interpreted as including the meaning of 'generating and providing'.

The failed data storage device 12i may receive a rebuild request Rebuild REQ from the host 110, and enter a rebuild mode in response to the rebuild request Rebuild REQ (operation 630). The failed data storage device 12i may use modules (refer to 800 in FIG. 2) for supporting a data rebuild operation of the host 110. The modules 800 may determine whether to support a data rebuild operation in response to the rebuild request Rebuild REQ, determine whether data read in response to a read request of the host 110 includes a faulty LBA address, divide the read data into a first region which is a normal region and a second region which is a faulty region, and transmit read-requested data including faulty LBA list information (i.e., a failed address list) of the second region along with data of the first region and the second region to the host 110.

The host 110 may issue a read request Read Request related to the rebuild request Rebuild REQ to the failed data storage device 12i (operation 640). The read request Read REQ used in the present embodiment may be provided as various types such as for example a read command and a read signal.

The failed data storage device 12i may transmit read-requested LBA data 652 including faulty LBA list information to the host 110 (operation 650). For example, the failed data storage device 12i may read data in response to read-requested LBA (LBA:N). Read data 651 may include normal regions which are faultless regions, and faulty regions. In the data 651 read from the read-requested LBA (LBA:N), normal regions may include errorless data (i.e., good data), while faulty regions may include erroneous data (i.e., bad data).

Figure 7:
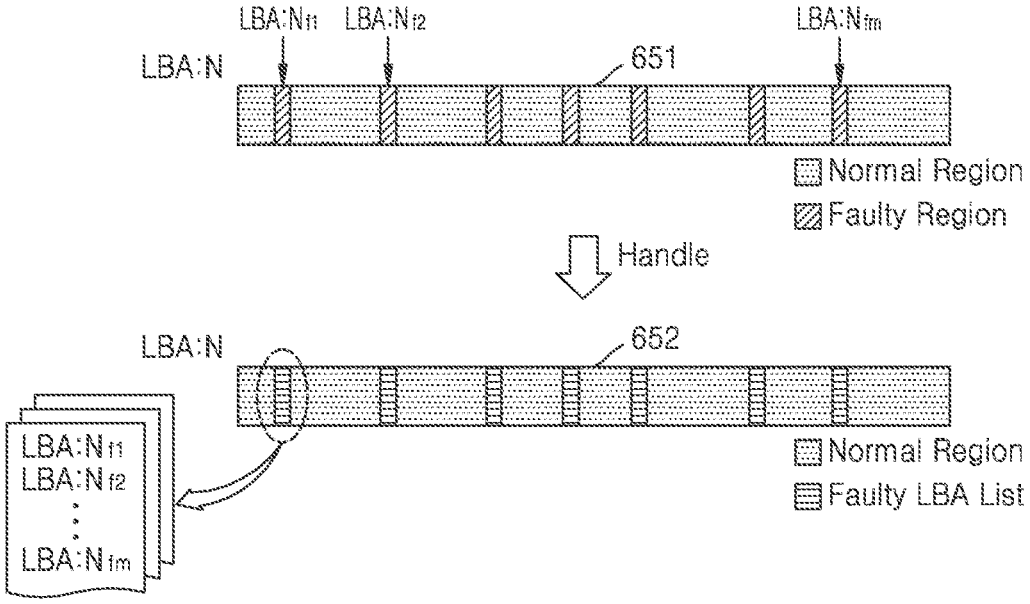
FIG. 7 illustrates a diagram explanatory of a read-requested logical block address (LBA) including faulty LBA list information of FIG. 6.

The failed data storage device 12i may load new data in faulty regions of the data 651 read from the read-requested LBA (LBA:N), and transmit the read-requested LBA data as including the new data loaded in the faulty regions of the read data 651 along with the good data of the normal regions of the read data 651 to the host 110. In this case, the new data of the faulty regions is not original bad data, but instead may be faulty LBA list information indicating the faulty regions of the read data 651. As shown in FIG. 7 and as will subsequently be described, the failed data storage device 12i may process the read data 651 from the read-requested LBA and transmit the processed data 651 as read-requested LBA data 652 to the host 110.

FIG. 7 illustrates a diagram explanatory of a read-requested logical block address (LBA) including faulty LBA list information of FIG. 6. Referring to FIG. 7, data 651 read from the read-requested LBA in the failed data storage device 12i may be divided into normal regions including good data and faulty regions including bad data. For example, in the read data 651, addresses of the faulty regions may correspond to faulty LBAs LBA:Nf1, LBA:Nf2, . . . , and LBA:Nfm. The failed data storage device 12i may intactly copy the good data of the normal regions of the read data 651 and handle (i.e., transmit) the copied data to the host 110. The failed data storage device 12i may replace the faulty regions of the read data 651 with the faulty LBA list information regarding faulty LBAs LBA:Nf1, LBA:Nf2, . . . , and LBA:Nfm and handle the replaced data to the host 110. That is, the failed data storage device 12i may handle the read-requested LBA data 652 including the copied data of the normal regions and the faulty LBA list information of the faulty regions to the host 110.

Referring back to FIG. 6, the host 110 may receive read-requested LBA data 652 including faulty LBA list information from the failed data storage device 12i. The host 110 may then start a rebuild operation based on the faulty LBA list information included in the read-requested LBA data 652 (operation 660).

In operation 660, the host 110 may rebuild data stored in the failed data storage device 12i based on the read-requested LBA data 652, and store the rebuilt data in the corresponding read-requested LBA (LBA:N) of the spare data storage device 12n+1 (operation 670). The host 110 may store the copied data of the normal regions of the read-requested LBA data 652 in normal portions of the spare data storage device 12n+1 corresponding thereto. The host 110 may rebuild data of the faulty regions from the read-requested LBA data 652 based on the faulty LBA list information.

For example, the host 110 may read data of regions corresponding to the faulty LBA list information from the remaining data storage devices other than the failed data storage device 12i from among the first to n-th data storage devices (refer to 121 to 12n in FIG. 1) in the RAID group 120, perform an XOR operation on the read data, and obtain rebuilt data.

The host 110 may fill a faulty region of the read-requested LBA data 652 with the rebuilt data without moving data into and out of a host buffer. The host 110 may store the rebuilt data, which corresponds to the bad data in the faulty regions of the read-requested LBA data 652, in regions of the spare data storage device 12n+1 corresponding to faulty LBA list information included in the read-requested LBA data 652. Thus, the host 110 may reduce overhead due to the movement of data and reduce a data rebuild time.

In the RAID group 120, the spare data storage device 12n+1 may store the copied data in regions corresponding to the normal regions of the read-requested LBA data 652, and store the rebuilt data in regions corresponding to the faulty regions of the read-requested LBA data 652. That is, the spare data storage device 12n+1 may store replacement data 671 including the copied data and the rebuilt data in the read-requested LBA (LBA:N).

In the above-described data rebuild operation, the read-requested LBA data 652 provided by the failed data storage device 12i may include faulty LBA list information regarding faulty LBAs LBA:Nf1, LBA:Nf2, . . . , and LBA:Nfm. Thus, the host 110 may avoid the overhead required to access each of the faulty LBAs LBA:Nf1, LBA:Nf2, . . . , and LBA:Nfm and obtain the corresponding faulty information. The host 110 may perform a data rebuild operation on the corresponding ones of the faulty LBAs LBA:Nf1, LBA:Nf2, . . . , and LBA:Nfm by using faulty LBA list information, without issuing a read request for accessing each of the faulty LBAs LBA:Nf1, LBA:Nf2, . . . , and LBA:Nfm each time.

After the data rebuild operation is performed by the host 110, the failed data storage device 12i of the RAID group 120 may be exchanged with the spare data storage device 12n+1.

A method of rebuilding data according to the present embodiment may reduce the number of read requests due to the data rebuild operation of the host 110, because the read-requested LBA data 652 includes the faulty LBA list information regarding the faulty LBAs LBA:Nf1, LBA:Nf2, . . . , and LBA:Nfm. As a result, a data rebuild time of the data storage system (refer to 100 in FIG. 1) may be reduced.

Figure 8:
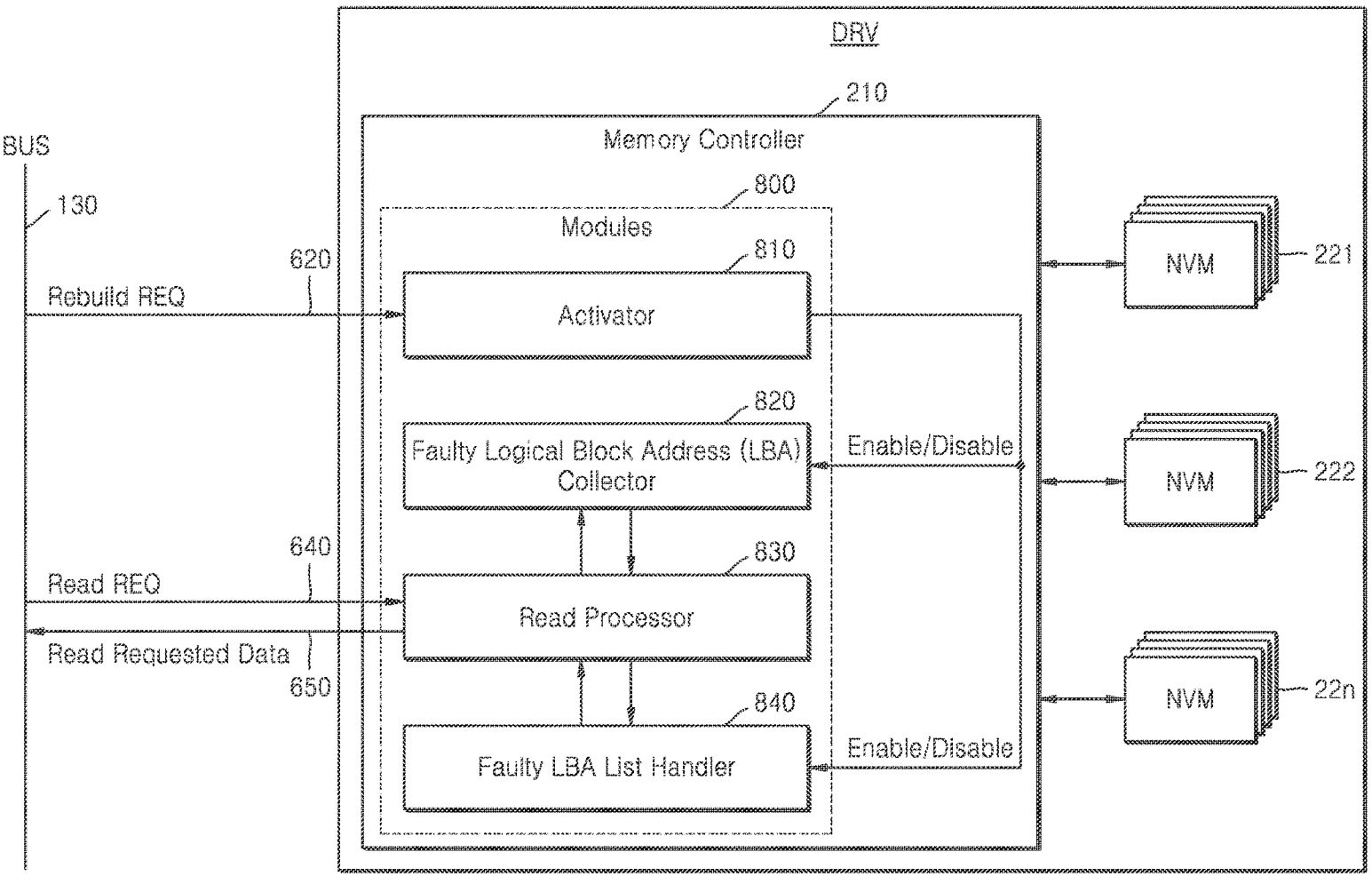
FIG. 8 illustrates a block diagram of a data storage device configured to support a data rebuild operation of FIG. 6, according to an embodiment of the inventive concept.

FIG. 8 is a block diagram of a data storage device DRV configured to support a data rebuild operation as described with respect to FIG. 6, according to an embodiment of the inventive concept. The data storage device DRV may be any one of the data storage devices 121 to 12n+1 of FIG. 1. The data storage device DRV may be configured as in the block diagram of FIG. 2. The data storage device DRV includes memory controller 210 and memories 221 to 22n (e.g., flash memories).

Referring to FIG. 8, the data storage device DRV may be linked to the host (refer to 110 in FIG. 6) through the bus 130. In the data storage device DRV, the memory controller 210 may include modules 800 for supporting a data rebuild operation. The modules may include an activator module 810, a faulty LBA collector module 820, a read processor module 830, and a faulty LBA list handler module 840. The modules 800 may be hardware modules physically implemented by analog and/or digital circuits such as logic gates, integrated circuits, microprocessors, microcontrollers, embedded controllers, memory circuits, passive electronic components, active electronic components, optical components, hardwired circuits, special-purpose hardware (e.g., an application specific integrated circuit (ASIC) and a digital signal processor (DSP)) and the like. In the alternative, the modules 800 may optionally be driven by firmware and/or software. The modules 800 may include programs, processes, or components for supporting the data rebuild operation. The modules 800 may include program instructions, program modules, data structures, or functions for supporting other operations. Also, the modules 800 may include processing instructions that may be read by firmware or the memory controller 210.

Although the present embodiment describes an example in which the modules 800 is included in the memory controller 210, the inventive concept is not limited thereto. For example, the modules 800 may be included in a component that is operatively suitable for supporting a data rebuild operation in the data storage device DRV.

The modules 800 may enable the data storage device DRV to enter a rebuild mode (refer to operation 630 in FIG. 6) in response to a rebuild request Rebuild REQ (operation 620) issued by the host (refer to 110 in FIG. 6), receive a read request Read Request related to the rebuild request Rebuild REQ (operation 640), process read data in response to the read request Read Request, and transmit read-requested LBA data (refer to 652 in FIGS. 6 and 7) including the copied data of the normal regions and the faulty LBA list information regarding the faulty region to the host 110 (operation 650).

The activator module 810 may enable the data storage device DRV to enter a rebuild mode (operation 630) in response to a rebuild request Rebuild RES provided from the host 110. The activator module 810 may determine whether or not to support a data rebuild operation of providing the read-requested LBA data 652 described with reference to FIGS. 6 and 7, in response to the rebuild request Rebuild REQ. The activator module 810 may activate the faulty LBA collector module 820 and the faulty LBA list handler module 840 in response to the rebuild request Rebuild REQ. In this regard, the activator module 810 is shown as configured to enable/disable the faulty LBA collector module 820 and the faulty LBA list handler module 840.

In an embodiment of the inventive concept, the activator module 810 may determine whether to support a data rebuild operation for providing read-requested LBA data as will be subsequently described with reference to FIGS. 9 to 11. For instance, the read-requested LBA data may include not only the copied data of the normal regions but also the faulty LBA list information of the faulty regions. The faulty LBA list information may replace bad data of the faulty regions, serve as sense data, or be included in a last region of the read-requested LBA data.

The faulty LBA collector module 820 may determine whether there is a faulty LBA address in a read request section of the host 110. The faulty LBA collector module 820 may operate in conjunction with the read processor module 830 and collect faulty LBAs mapped with faulty PBAs affected by errors or faults in the data storage device DRV. The faulty LBA collector module 820 may keep faulty LBA list information regarding the collected faulty LBAs (e.g., LBA:Nf1, LBA:Nf2, . . . , and LBA:Nfm in FIG. 7). Alternatively, the faulty LBA collector module 820 may collect faulty LBAs, which are generated during a read operation of the data storage device DRV, on-demand.

The read processor module 830 may handle (i.e., transmit) read-requested LBA data (refer to 652 in FIGS. 6 and 7) to the host 110, responsive to a read request Read Request from the host 110 (operation 640). The read processor module 830 may refer to the faulty LBA list information collected by the faulty LBA collector module 820, load the copied data in the normal regions of the read-requested LBA data 652, load the faulty LBA list information in the faulty regions of the read-requested LBA data 652, and handle the read-requested LBA data 652 to the host 110.

In an embodiment, the read processor module 830 may refer to the faulty LBA list information collected by the faulty LBA collector module 820, load the copied data in the normal regions of the read-requested LBA data 652, fill the faulty regions of the read-requested LBA data 652 with a specific data pattern, and handle the read-requested LBA data 652 to the host 110. For example, the specific data pattern filled in the faulty regions may be zeroed out or marked with a faulty pattern engaged with the host 110.

The faulty LBA list handler module 840 may provide a method of handling (i.e., transmitting) the faulty LBA list information of the data storage device DRV to the host 110 in response to a read request Read REQ. The faulty LBA list handler module 840 may use a method of handling faulty LBA list information, which will be subsequently described with reference to FIGS. 9 to 11B.

Figure 9:
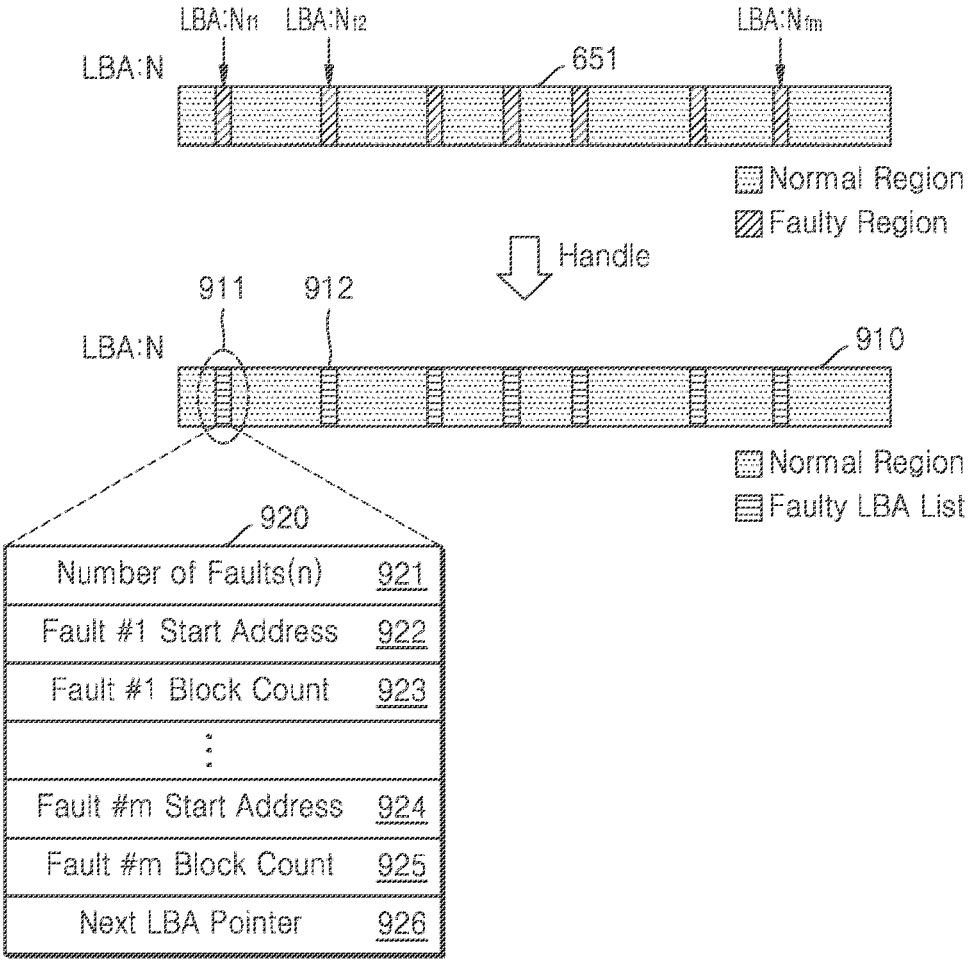
FIG. 9 illustrates a diagram of read-requested LBA data including faulty LBA information according to an embodiment of the inventive concept.

FIG. 9 illustrates a diagram of read-requested LBA data including faulty LBA information, according to an embodiment of the inventive concept. Referring to FIGS. 8 and 9, the faulty LBA list handler module 840 may handle read-requested LBA data 910, which is obtained by loading the copied data of the normal regions of the data 651 read from the read-requested LBA (LBA:N) and loading faulty LBA list information in regions corresponding to the faulty regions of the data 651, to the host 110. The read-requested LBA data 910 may include details such as described with respect to the read-requested LBA data 652 of FIG. 7.

Faulty LBA list information 920 loaded in a first faulty region 911 of the read-requested LBA data 910 may include a total number 921 of faulty LBAs LBA:Nf1, LBA:Nf2, . . . , and LBA:Nfm of the read data 651, a start address 922 of a first faulty LBA, the number 923 indicating a block count of the first faulty LBA, a start address 924 of an m-th faulty LBA, and the number 925 indicating a block count of the m-th faulty LBA. For example, the start address 922 of the first faulty LBA may be LBA:Nf1, and the start address 924 of the m-th faulty LBA may be LBA:Nfm.

Meanwhile, when the read data 651 includes a plurality of faulty regions, the entire faulty LBA list information 920 may not be included in the first faulty region 911. In this case, the faulty LBA list information 920 may further include a next LBA pointer 926 indicating an address of a second faulty region 912 in which next faulty LBA list information is loaded. For instance, an address LBA:Nf2 of the second faulty region 912 may be stored in the next LBA pointer 926.

Similarly, the second faulty region 912 may include a start address of a next faulty LBA and a number indicating a block count of the next faulty LBA, and optionally may include a next LBA pointer.

The read processor module 830 may handle read LBA data 910 including the faulty LBA list information 920 to the host 110. The host 110 may perform a data rebuild operation on the corresponding faulty LBAs LBA:Nf1, LBA:Nf2, . . . , and LBA:Nfm by using the faulty LBA list information 920.

Figure 10:
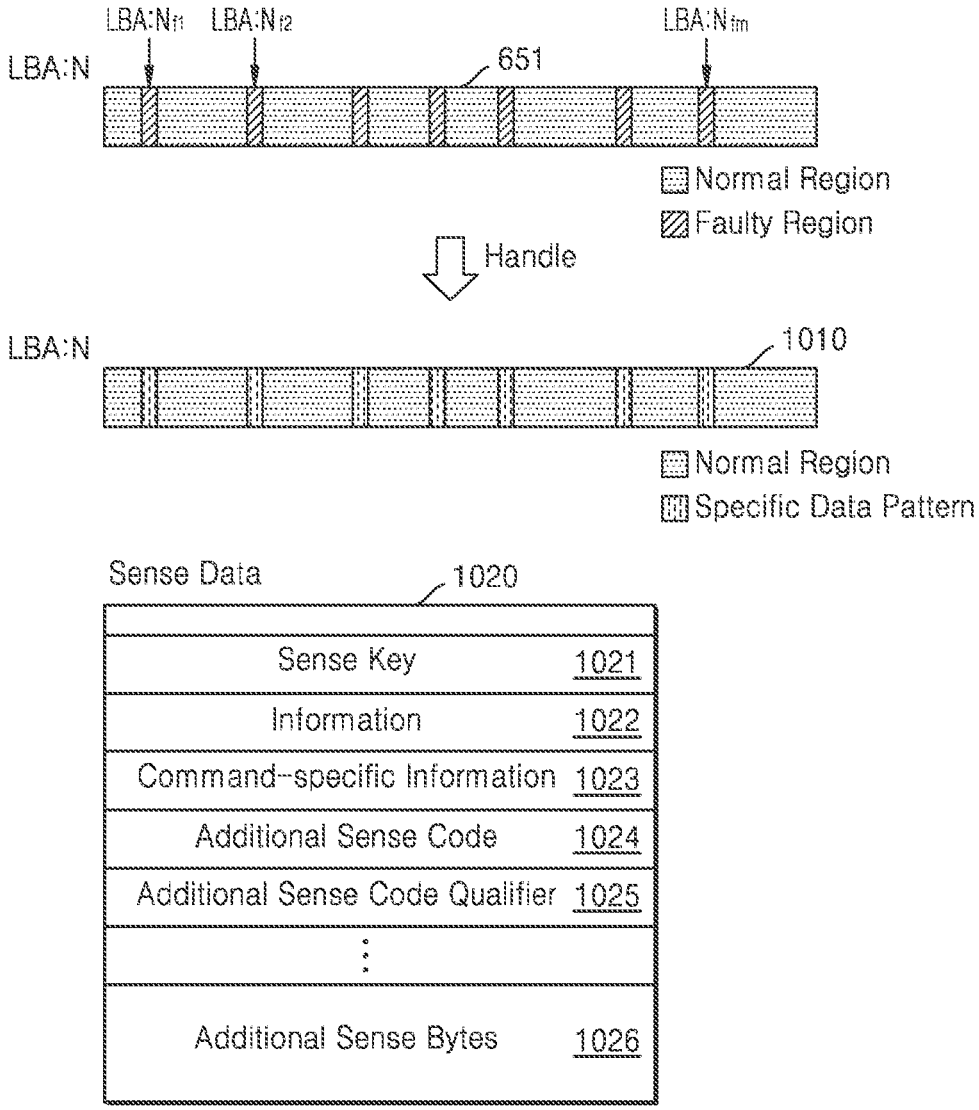
FIG. 10 illustrates a diagram of read-requested LBA data including faulty LBA information according to another embodiment of the inventive concept.

FIG. 10 illustrates a diagram of read-requested LBA data including faulty LBA information, according to another embodiment of the inventive concept. Referring to FIGS. 8 and 10, the faulty LBA list handler module 840 may handle read-requested LBA data 1010, which is obtained by loading the copied data of the normal regions of the data 651 read from the read-requested LBA (LBA:N) and filling regions corresponding to the faulty regions of the read data 651 with a specific data pattern, to the host 110. As described previously, the specific data pattern filled in the faulty regions may be zeroed out or marked with a faulty pattern engaged with the host 110. That is, the specific data pattern may be a predetermined data pattern recognizable by the host 110 as indicative of a faulty region.

For example, for purposes of illustration, it may be assumed that a bus 130 between the host 110 and the data storage device DRV is embodied by an SCSI interface. The SCSI interface may transmit bad data along with sense data to reduce failures in data transmission during the transmission, backup, and/or recovery of data between devices. The host 110 may read the sense data and recover bad data. Since the read data 651 includes the faulty regions, the data storage device DRV may provide sense data 1020 along with the read-requested LBA data 1010 to the host 110.

The sense data 1020 may include a sense key field 1021, an information field 1022, a command-specific information field 1023, an additional sense code field 1024, an additional sense code qualifier field 1025, and an additional sense bytes field 1026.

The sense key field 1021 may include a recovered error indicating that a recovery operation has successfully been completed in response to a final command, a not-ready error indicating that an addressed logical unit cannot be accessed, a medium error indicating that a command has been terminated under irrecoverable error conditions, and a hardware error indicating that a disk drive is an irrecoverable hardware failure.

For instance, the faulty LBA list handler module 840 may include a key capable of informing the sense key field 1021 of the method of handling faulty LBA list information according to the present embodiment. The faulty LBA list handler module 840 may include hints that suggest faulty LBA list information to the information field 1022. For example, the faulty LBA list handler module 840 may provide, as the hints, first address information of each of faulty LBAs LBA:Nf1, LBA:Nf2, . . . , and LBA:Nfm of the read data 651.

The faulty LBA list handler module 840 may add the faulty LBA list information 920 described with reference to FIG. 9 to the additional sense bytes field 1026 of the sense data 1020. The additional sense bytes field 1026 may have such a large size as to include all pieces of information regarding the faulty LBAs LBA:Nf1, LBA:Nf2, . . . , and LBA:Nfm of the read data 651. Thus, the faulty LBA list information 920 loaded in the additional sense bytes field 1026 may not include a next LBA pointer 926. The command-specific information field 1023, the additional sense code field 1024, and the additional sense code qualifier field 1025 include SCSI codes.

The read processor module 830 may handle the read requested LBA data 1010 and sense data 1020 to the host 110. The host 110 may perform a data rebuild operation on the corresponding faulty LBAs LBA:Nf1, LBA:Nf2, . . . , and LBA:Nfm by using the sense data 920.

Figure 11A:
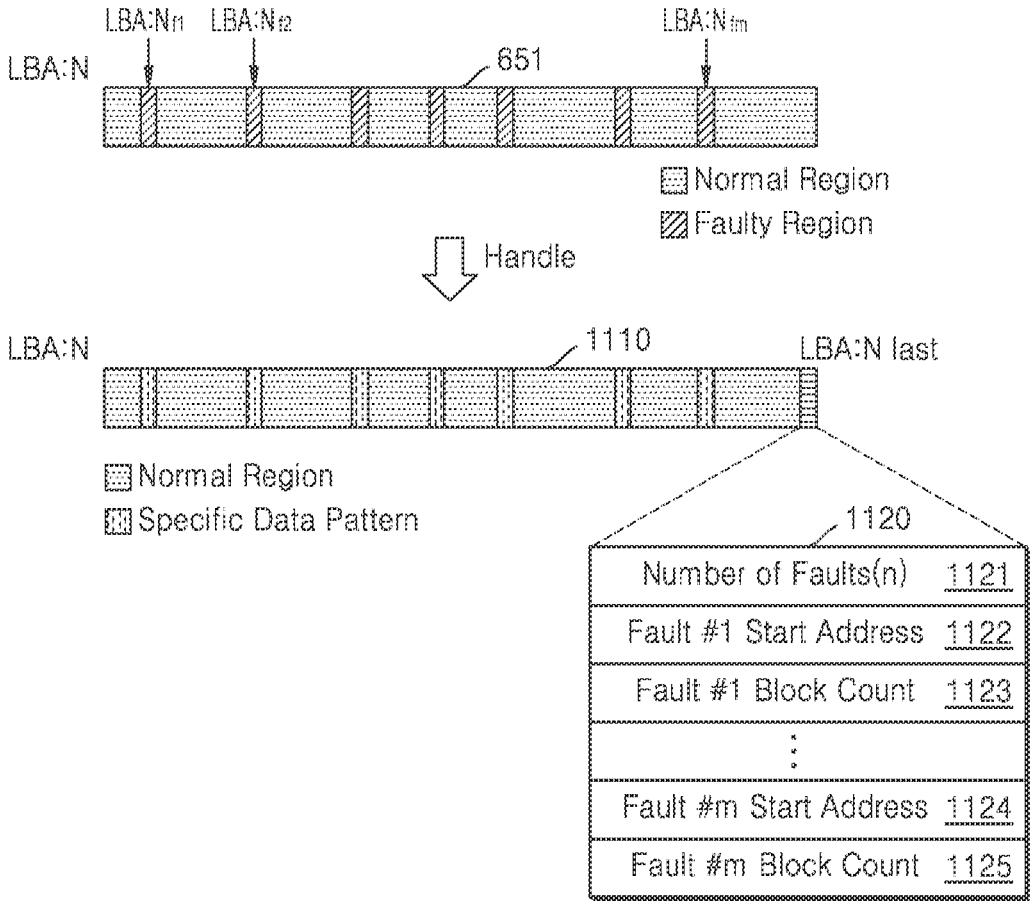
FIG. 11A illustrates a diagram of read-requested LBA data including faulty LBA information according to a still further embodiment of the inventive concept.

FIG. 11A illustrates a diagram of read-requested LBA data including faulty LBA information, according to a still further embodiment of the inventive concept. Referring to FIGS. 8 and 11A, the faulty LBA list handler module 840 may handle read-requested LBA data 1110, which is obtained by loading copied data of normal regions of the data 651 read from the read-requested LBA (LBA:N) and filling regions corresponding to faulty regions of the data 651 with a specific data pattern, to the host 110.

In the read-requested LBA data 1110, a last logical LBA (LBA:Nlast) may include the faulty LBA list information described with reference to FIG. 9. Here, the last logical LBA (LBA:Nlast) may be set not to be used to store data during communications with the host 110. For example, the host 110 may be controlled to store data in or retrieve data from the last logical LBA (LBA:Nlast).

The last logical LBA (LBA:Nlast) may have such a large size as to include all pieces of information regarding the faulty LBAs LBA:Nf1, LBA:Nf2, . . . , and LBA:Nfm of the read data 651. Thus, faulty LBA list information 1120 included at the last logical LBA (LBA:Nlast) may include a total number 1121 of faulty LBAs LBA:Nf1, LBA:Nf2, . . . , and LBA:Nfm, a start address 1122 of a first faulty LBA, the number 1123 indicating a block count of the first faulty LBA, a start address 1124 of an m-th faulty LBA, and the number 1125 indicating a block count of the m-th faulty LBA.

The read processor module 830 may handle read-requested LBA data 1110 including the faulty LBA list information 1120 included at the last logical LBA (LBA:Nlast) to the host 110). The host 110 may perform a data rebuild operation on the corresponding faulty LBAs LBA:Nf1, LBA:Nf2, . . . , and LBA:Nfm by using the faulty LBA list information 1120 included at the last logical LBA (LBA:Nlast).

Figure 11B:
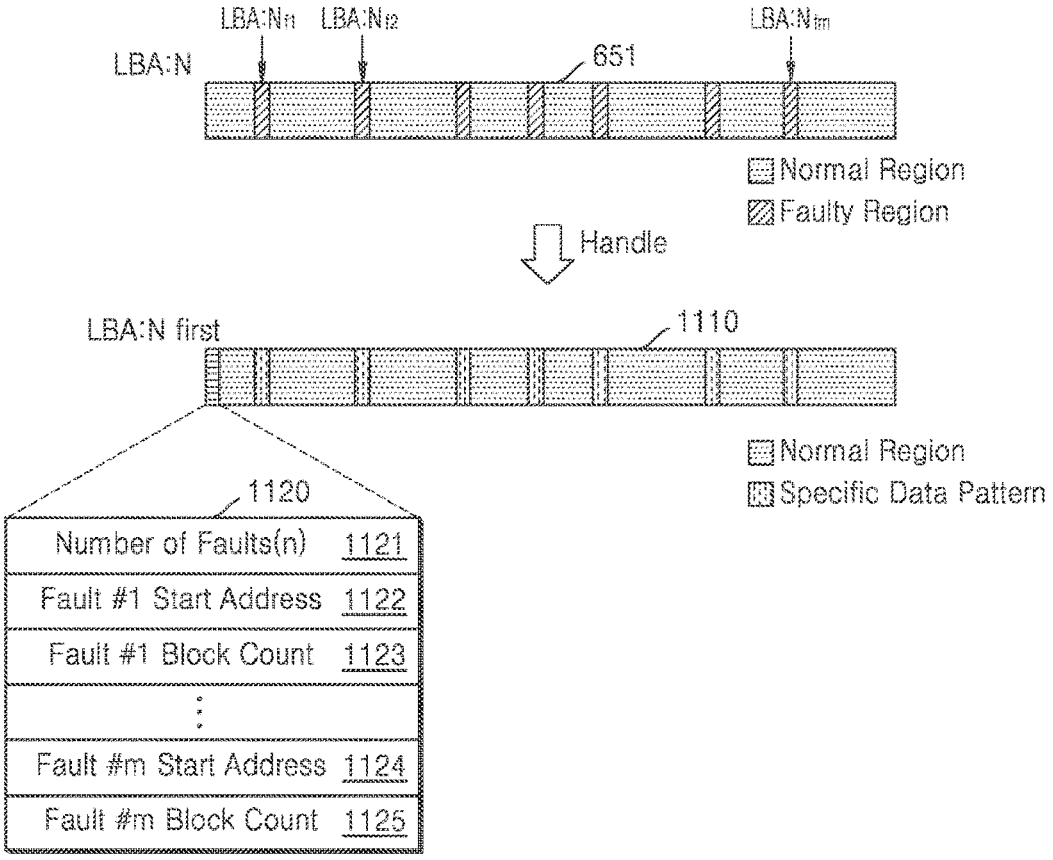
FIG. 11B illustrates a diagram of read-requested LBA data including faulty LBA information according to another still further embodiment of the inventive concept.

FIG. 11B illustrates a diagram of read-requested LBA data including faulty LBA information, according to another still further embodiment of the inventive concept. Referring to FIGS. 8 and 11B, as compared with FIG. 11A, the faulty LBA list handler module 840 (see FIG. 8) may include faulty LBA list information at a first logical LBA (LBA:Nfirst) of the read-requested LBA data 1110. Thus, the first logical LBA (LBA:Nfirst) may be set not to be used to store data during communications with the host 110. For example, the host 110 may be controlled not to store data in or retrieve data from the first logical LBA (LBA:Nfirst).

The faulty LBA list information 1120 included in the first logical LBA (LBA:Nfirst) may include the total number 1121 of faulty LBAs LBA:Nf1, LBA:Nf2, . . . , and LBA:Nfm, a start address 1122 of a first faulty LBA, the number 1123 indicating a block count of the first faulty LBA, a start address 1124 of an m-th faulty LBA, and the number 1125 indicating a block count of the m-th faulty LBA.

The read processor module 830 may handle read-requested LBA data 1110 including the faulty LBA list information 1120 included at the first logical LBA (LBA:Nfirst) to the host 110. The host 110 may perform a data rebuild operation on the faulty LBAs LBA:Nf1, LBA:Nf2, . . . , and LBA:Nfm by using the faulty LBA list information 1120 included at the first logical LBA (LBA:Nfirst).

Figure 12:
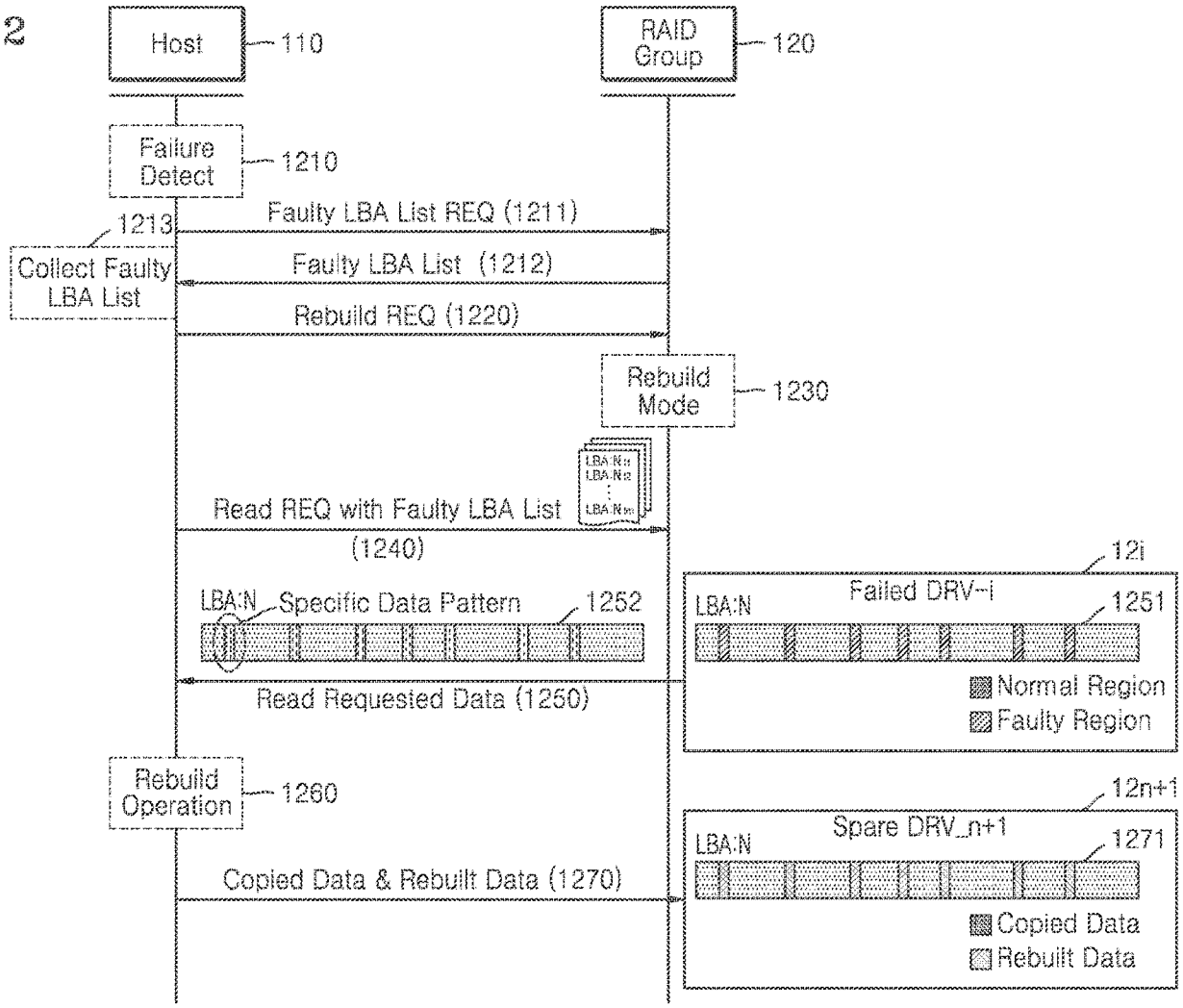
FIG. 12 illustrates a diagram explanatory of a method of rebuilding data, which is performed by a data storage system, according to an embodiment of the inventive concept.

FIG. 12 illustrates a diagram explanatory of a data rebuild operation performed by a data storage system, according to an embodiment of the inventive concept.

Referring to FIG. 12, a host 110 may communicate with data storage devices 121 to 12n−1 to store data in or retrieve data from a RAID group 120. During the communication process, any one of the data storage devices 121 to 12n−1 in the RAID group 120 may be in a failure state or indicate failure signs. For example, for purposes of illustration, in the following it is assumed that an i-th data storage device 12i as shown in FIG. 1 is a failed data storage device.

The host 110 may detect a failure related to the failed data storage device 12i (operation 1210). The host 110 may request a faulty LBA list from the failed data storage device 12i (operation 1211). The failed data storage device 12i may transmit the requested faulty LBA list to the host 110 (operation 1212). The host 110 may collect the transmitted faulty LBA list (operation 1213).

The host 110 may issue a rebuild request Rebuild REQ to the failed data storage device 12i to retain data of the failed data storage device 12i (operation 1220). The failed data storage device 12i may enter a rebuild mode (operation 1230) in response to the received rebuild request Rebuild REQ, and modules 800 (in FIG. 2) may support a data rebuild operation of the host 110.

The host 110 may issue a read request Read Request to the failed data storage device 12i and may transmit the faulty LBA list along with the read request Read Request (operation 1240). In this case, the host 110 may issue a read request Read Request for preventing the transmission of the faulty LBA list to the failed data storage device 12i.

The failed data storage device 12i may transmit the read data 1251 to the host 110 in response to the read request Read Request for preventing the transmission of the faulty LBA list. In this case, the failed data storage device 12i may not transmit the faulty LBA list. The failed data storage device 12i may prepare read-requested LBA data 1252, which is obtained by loading specific data in regions corresponding to faulty regions of the read data 1251, and may transmit the specific data loaded in the faulty regions along with good data of normal regions of the read data 1251 to the host 110 as the read-requested LBA data 1252. The faulty regions may be filled with not original bad data but with a specific data pattern. For example, the faulty regions may be zeroed out or marked with a faulty pattern engaged with the host 110.

The host 110 may receive the read-requested LBA data 1252, which is obtained by filling the faulty regions of the read data 1251 with specific data, from the failed data storage device 12i (operation 1250). The host 110 may start a rebuild operation (operation 1260) based on the faulty LBA list information transmitted from the failed data storage device 12i in operation 1212.

The host 110 may rebuild data stored in the failed data storage device 12i based on the read-requested LBA data 1252, and store the rebuilt data at the corresponding read-requested LBA (LBA:N) of the spare data storage device 12n+1 (operation 1270). The host 110 may store copied data of normal regions of the read-requested LBA data 1252 in normal portions of the spare data storage device 12n+1

(Spare DRV_n+1), and store the rebuilt data in failed portions of the spare data storage device 12n+1.

The spare data storage device 12n+1 may store the copied data in portions corresponding to normal portions of the failed data storage device 12i, and store the rebuilt data in portions corresponding to failed portions of the failed data storage device 12i. The spare data storage device 12n+1 may store data 1271, which is a combination of the copied data and the rebuilt data, in the corresponding LBA (LBA:N).

In the present embodiment, the host 110 may previously collect the faulty LBA list information and perform the data rebuild operation. Thus, the transmitted read-requested LBA data 1252 in this embodiment does not include information regarding the faulty LBAs LBA:Nf1, LBA:Nf2, . . . , and LBA:Nfm such as in the embodiments described above with reference to FIGS. 9 to 11B.

Figure 13:
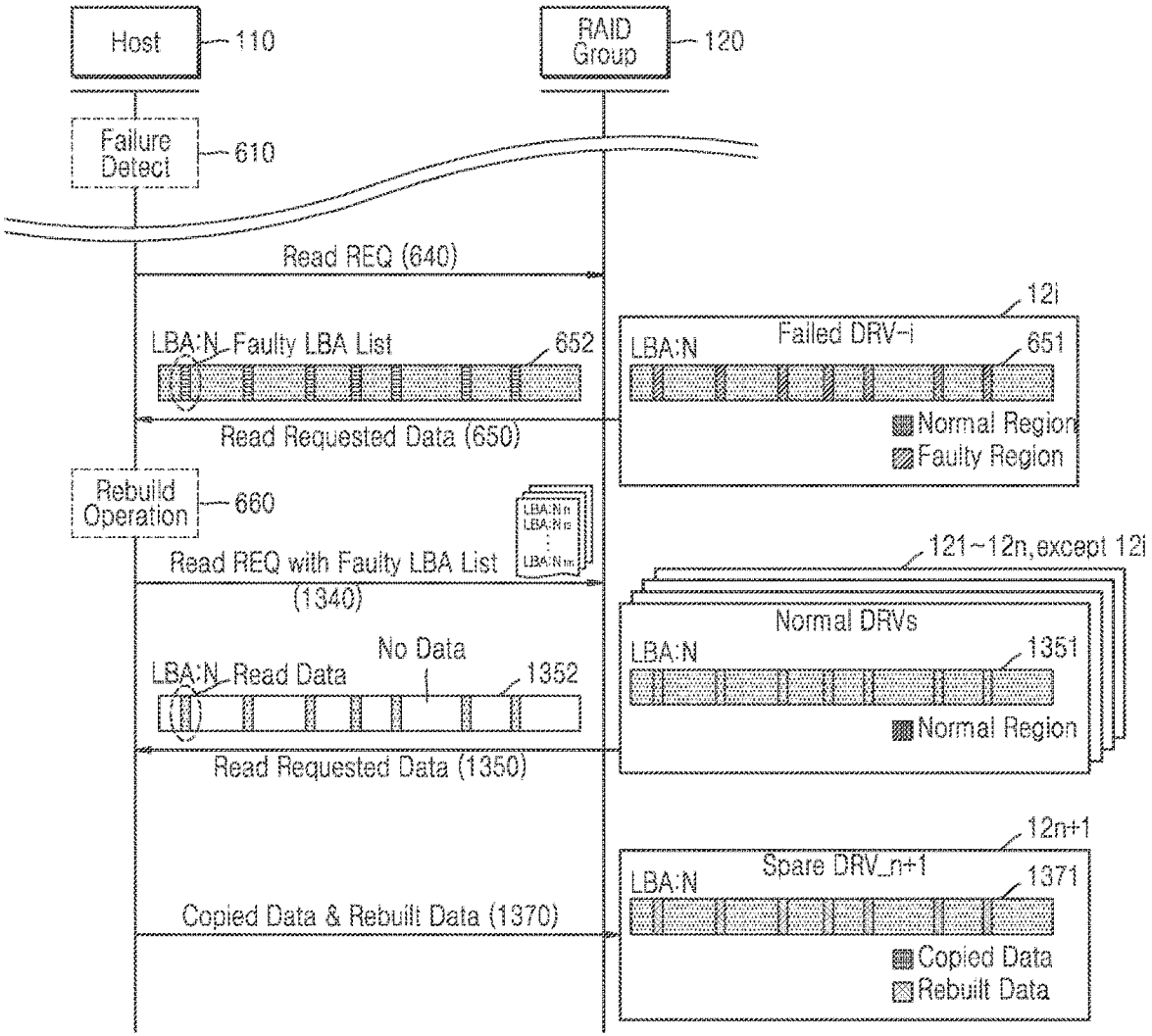
FIG. 13 illustrates a diagram explanatory of a data rebuild operation, which is performed by a data storage system, according to an embodiment of the inventive concept.

FIG. 13 illustrates a diagram explanatory of a data rebuild operation, which is performed by a data storage system, according to an embodiment of the inventive concept FIG. 13 illustrates a case in which the data rebuild operation of FIG. 6 is performed based on faulty LBA list information. FIG. 13 may thus include similar operations as described with respect to the data rebuild operation of FIG. 6, and detailed explanation of such similar operations may be omitted from the following.

Referring to FIGS. 6 and 13, the host 110 may detect the failed data storage device 12i included in the RAID group 120 as a failure (operation 610), and issue a rebuild request Rebuild REQ to the failed data storage device 12i (e.g., operation 620 such as shown in FIG. 6). The failed data storage device 12i may receive a rebuild request Rebuild REQ from the host 110, and enter a rebuild mode (e.g., operation 630 such as shown in FIG. 6) in response to the rebuild request Rebuild REQ. Although not shown, it should be understood that operations 620 and 630 shown in FIG. 6 are included in the data rebuild operation of FIG. 13, but are not shown in FIG. 13 to avoid complexity.

The host 110 may issue a read request Read Request related to the rebuild request Rebuild REQ to the failed data storage device 12i (operation 640), and the failed data storage device 12i may transmit read-requested LBA data 652 including faulty LBA list information to the host 110 (operation 650). The host 110 may start a rebuild operation based on the faulty LBA list information included in the read-requested LBA data 652 (operation 660). In this case, the host 110 may copy data of normal regions from the read-requested LBA data 652 and store the copied data in the first buffer (e.g., 1510 in FIG. 15).

The host 110 may issue a read request Read Request along with faulty LBA list information to the remaining data storage devices (i.e., normal data storage devices) other than the failed data storage device 12i from among the data storage devices 121 to 12n (operation 1340).

From among data 1351 read at the read-requested LBA, the normal data storage devices 121 to 12n (except 12i) may transmit data of regions of the read data 1351 corresponding to the faulty LBA list information as read-requested LBA data 1352 to the host 110 (operation 1350). The read data 1351 may not be loaded in regions other than the regions of the read-requested LBA data 1352 corresponding to the faulty LBA list information (No Data).

From among the read-requested LBA data 1352 transmitted by the normal data storage devices 121 to 12n (except 12i), the host 110 may perform a parity operation, such as an XOR operation, on data of regions of the read-requested LBA data 1352 corresponding to the faulty LBA list information. The host 110 may obtain rebuilt data as a result of the parity operation.

The host 110 may combine copied data, which is obtained from the read-requested LBA data 652 of the failed data storage device 12i, with rebuilt data, which is obtained from read-requested LBA data 1352 of the normal data storage devices 121 to 12n (e.g., 12i). The host 110 may transmit combined data 1371, which is a combination of the copied data and the rebuilt data, to a spare data storage device 12n+1 (operation 1370).

The spare data storage device 12n+1 may receive the combined data 1371, store the copied data in portions corresponding to normal portions of the failed data storage device 12i in the LBA (LBA:N), and store rebuilt data in portions corresponding to failed portions of the failed data storage device 12i.

Figure 14:
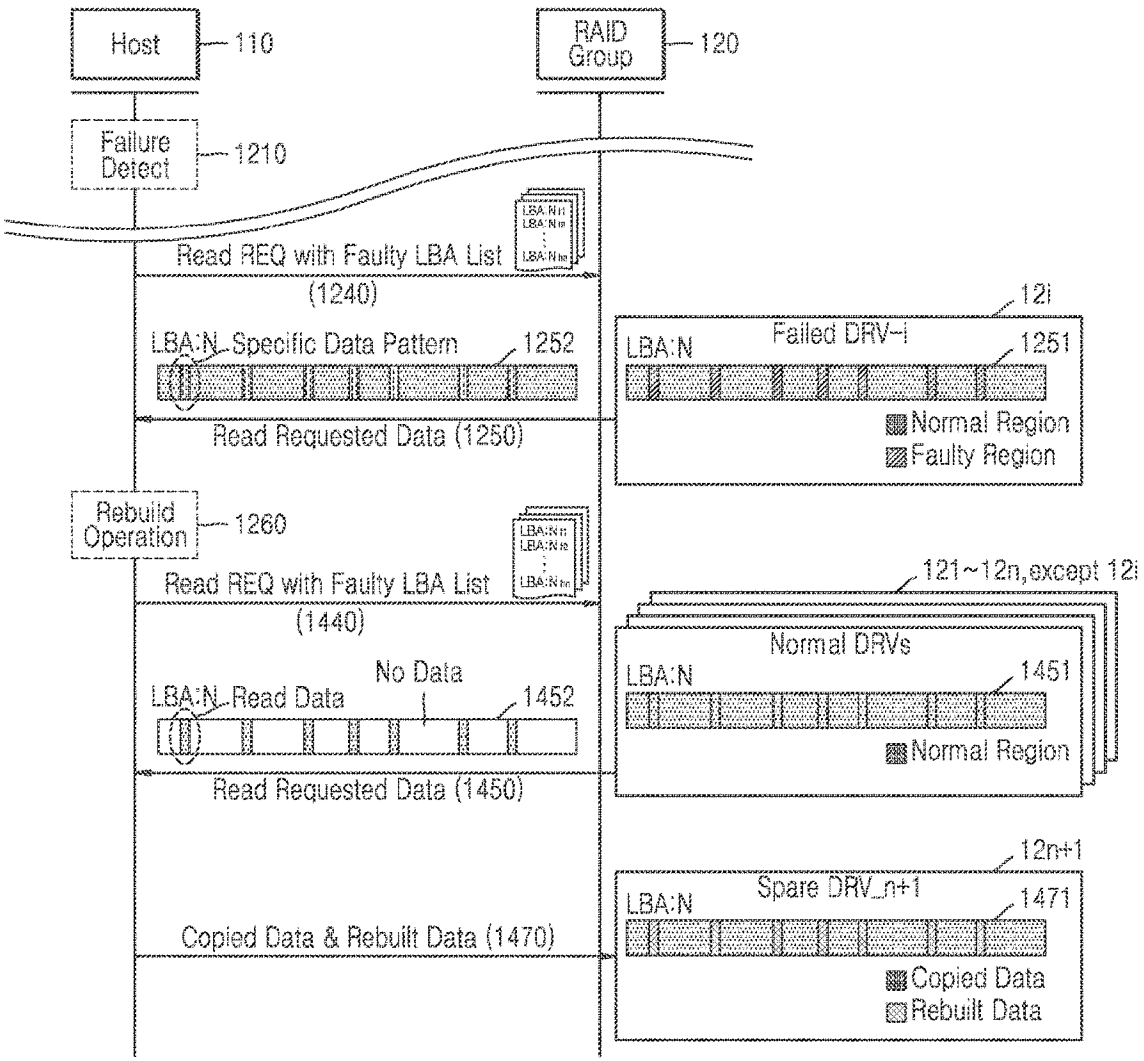
FIG. 14 illustrates a diagram explanatory of a data rebuild operation, which is performed by a data storage system, according to another embodiment of the inventive concept.

FIG. 14 illustrates a diagram explanatory of a data rebuild operation, which is performed by a data storage system, according to another embodiment of the inventive concept. FIG. 14 illustrates a case in which the data rebuild operation of FIG. 12 is performed based on faulty LBA list information. FIG. 14 may thus include similar operations as described with respect to the data rebuild operation of FIG. 12, and detailed explanation of such similar operations may be omitted from the following.

Referring to FIGS. 12 and 14, the host 110 may detect the failed data storage device 12i of the RAID group 120 as a failure (operation 1210), request a faulty LBA list from the failed data storage device 12i (e.g., operation 1211 such as shown in FIG. 12), receive the faulty LBA list from the failed data storage device 12i (e.g., operation 1212 such as shown in FIG. 12), and collect the faulty LBA list (e.g., operation 1213 such as shown in FIG. 12). The host 110 may issue a rebuild request Rebuild REQ to the failed data storage device 12i (e.g., operation 1220 such as shown in FIG. 12). The failed data storage device 12i may receive the rebuild request Rebuild REQ from the host 110 and enter a rebuild mode (e.g., operation 1230 such as shown in FIG. 12) in response to the rebuild request Rebuild REQ (1230). Although not shown, it should be understood that operations 1211, 1212, 1213, 1220 and 1230 shown in FIG. 12 are included in the data rebuild operation of FIG. 14, but are not shown in FIG. 14 to avoid complexity.

The host 110 may issue a read request Read Request for preventing the transmission of a faulty LBA list to the failed data storage device 12i (operation 1240), and the failed data storage device 12i may prepare read-requested LBA data 1252 which is obtained by loading specific data (e.g., zeroed-out data or data marked with a faulty pattern) in regions corresponding to faulty regions of the read data 1251 and may transmit the specific data loaded in the faulty regions of the read data 1251 along with good data of normal regions of the read data 1251 to the host 110 as the read-requested LBA data 1252.

The host 110 may receive read-requested LBA data 1252 having faulty regions filled with specific data from the failed data storage device 12i (operation 1250). The host 110 may start a rebuild operation based on the collected faulty LBA list information (operation 1260). In this case, the host 110 may copy the data of the normal regions from the read-requested LBA data 1252 of the failed data storage device 12i and store the copied data.

The host 110 may issue a read request Read Request along with the faulty LBA list information to the remaining data storage devices (i.e., normal data storage devices) other than the failed data storage device 12i from among the data storage devices 121 to 12n (operation 1440).

From among data 1451 read at a read-requested LBA, the normal data storage devices 121 to 12n (except 12i) may transmit data of regions of the data 1451 corresponding to the faulty LBA list information as read-requested LBA data 1452 to the host 110 (operation 1450). Read data may not be loaded in regions other than the regions of the read-requested LBA data 1452 corresponding to the faulty LBA list information (No Data).

From the read-requested LBA data 1452 transmitted by the normal data storage devices 121 to 12n (except 12i), the host 110 may perform a parity operation, such as an XOR operation, on data of regions of the read-requested LBA data 1452 corresponding to faulty LBA list information, and obtain rebuilt data as a result of the parity operation.

The host 110 may combine copied data, which is obtained from the read-requested LBA data 1252 of the failed data storage device 12i, with rebuilt data, which is obtained from the read-requested LBA data 1452 of the normal data storage devices 121 to 12n (i.e., 12i). The host 110 may transmit combined data 1471, which is a combination of the copied data and the rebuilt data, to a spare data storage device 12n+1 (operation 1470).

The spare data storage device 12n+1 may receive the combined data 1471, store the copied data in portions corresponding to the normal portions of the failed data storage device 12i in an LBA (LBA:N), and store rebuilt data in portions corresponding to failed portions of the failed data storage device 12i.

Figure 15:
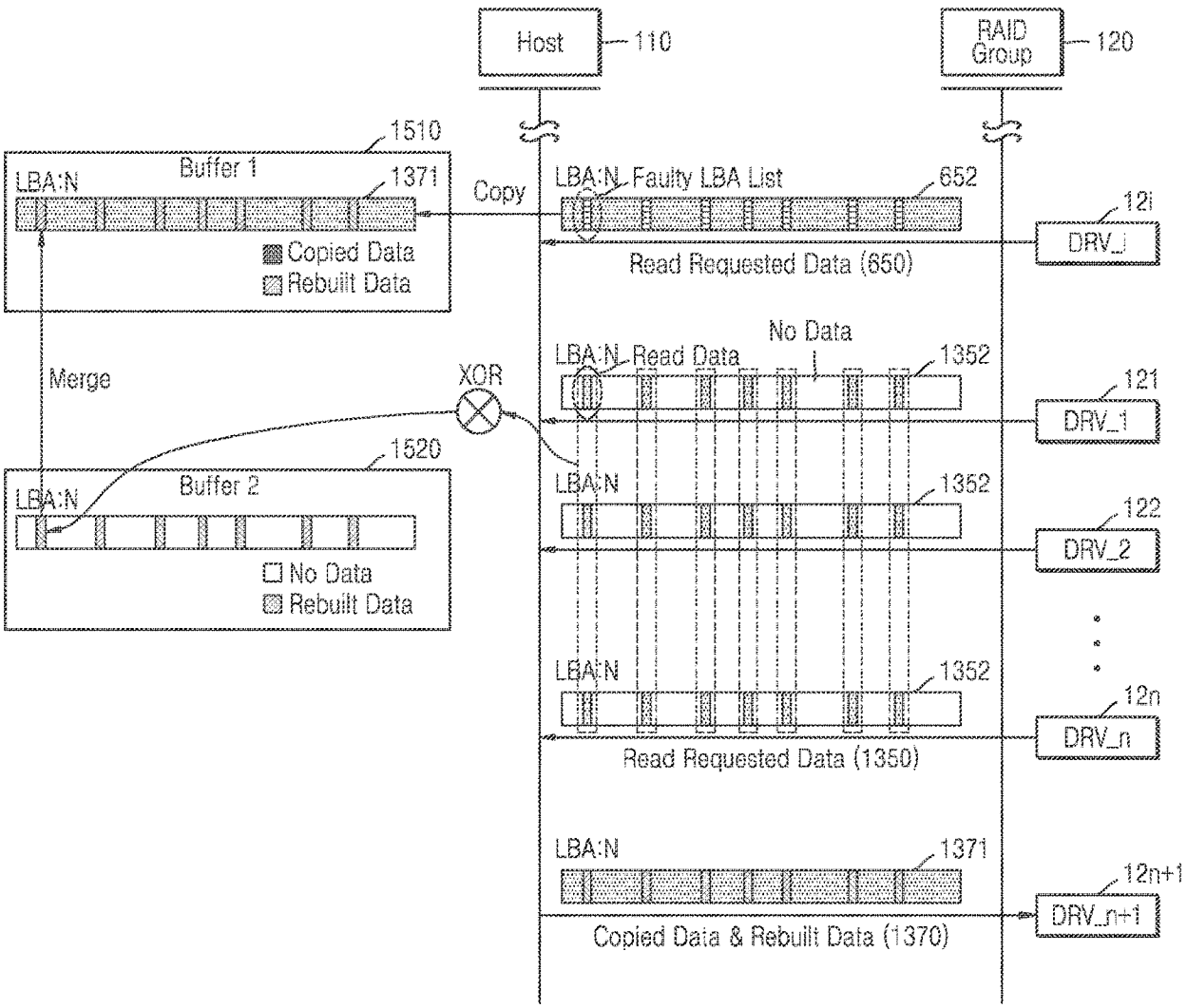
FIG. 15 illustrates a diagram explanatory of a method of rebuilding data according to an embodiment of the inventive concept.

FIG. 15 illustrates a diagram explanatory of a method of rebuilding data, according to an embodiment of the inventive concept. Although not shown, operations 610, 620, 630 and 640 shown in and/or described with respect to FIG. 6 and FIG. 13 may be included in the method of rebuilding data of FIG. 15, but are not shown in FIG. 15 to avoid complexity.

Referring to FIGS. 13 and 15, the host 110 may receive the read-requested LBA data 652 including faulty LBA list information from the failed data storage device 12i (operation 650). The host 110 may copy data of normal regions from the read-requested LBA data 652, and store the copied data in normal portions of the first buffer 1510.

From among the data 1351 (as shown in FIG. 13) read at the read-requested LBA from the normal data storage devices 121 to 12n (except 12i), the host 110 may receive as the read-requested LBA data 1352 data of regions of the data 1351 which correspond to regions of the faulty LBA list information of the read-requested LBA data 652. The host 110 may perform an XOR operation on the data of the regions of the read-requested LBA data 1352 which correspond to the faulty LBA list information. The host 110 may store rebuilt data, which is obtained by the XOR operation, in regions of a second buffer 1520 corresponding to regions of the faulty LBA list information.

The host 110 may combine in the first buffer 1510 the content of the first buffer 1510 in which the copied data is stored in the normal portions, with the content of the second buffer 1520 in which the rebuilt data 1521 is stored in portions corresponding to regions of the faulty LBA list information. Thus, combined data 1371, which is obtained by combining the copied data of the normal portions of the first buffer 1510 with the rebuilt data 1521 stored in the portions of the second buffer 1520 corresponding to regions of the faulty LBA list information, may be stored in the first buffer 1510.

The host 110 may transmit the combined data 1371, which is a combination of the copied data and the rebuilt data, to the spare data storage device 12n+1 (operation 1370).

The spare data storage device 12n+1 may receive the combined data 1371, store the copied data in portions of the LBA (LBA:N) corresponding to normal portions of the failed data storage device 12i, and store the rebuilt data in portions of the LBA (LBA:N) corresponding to failed portions of the failed data storage device 12i.

Figure 16:
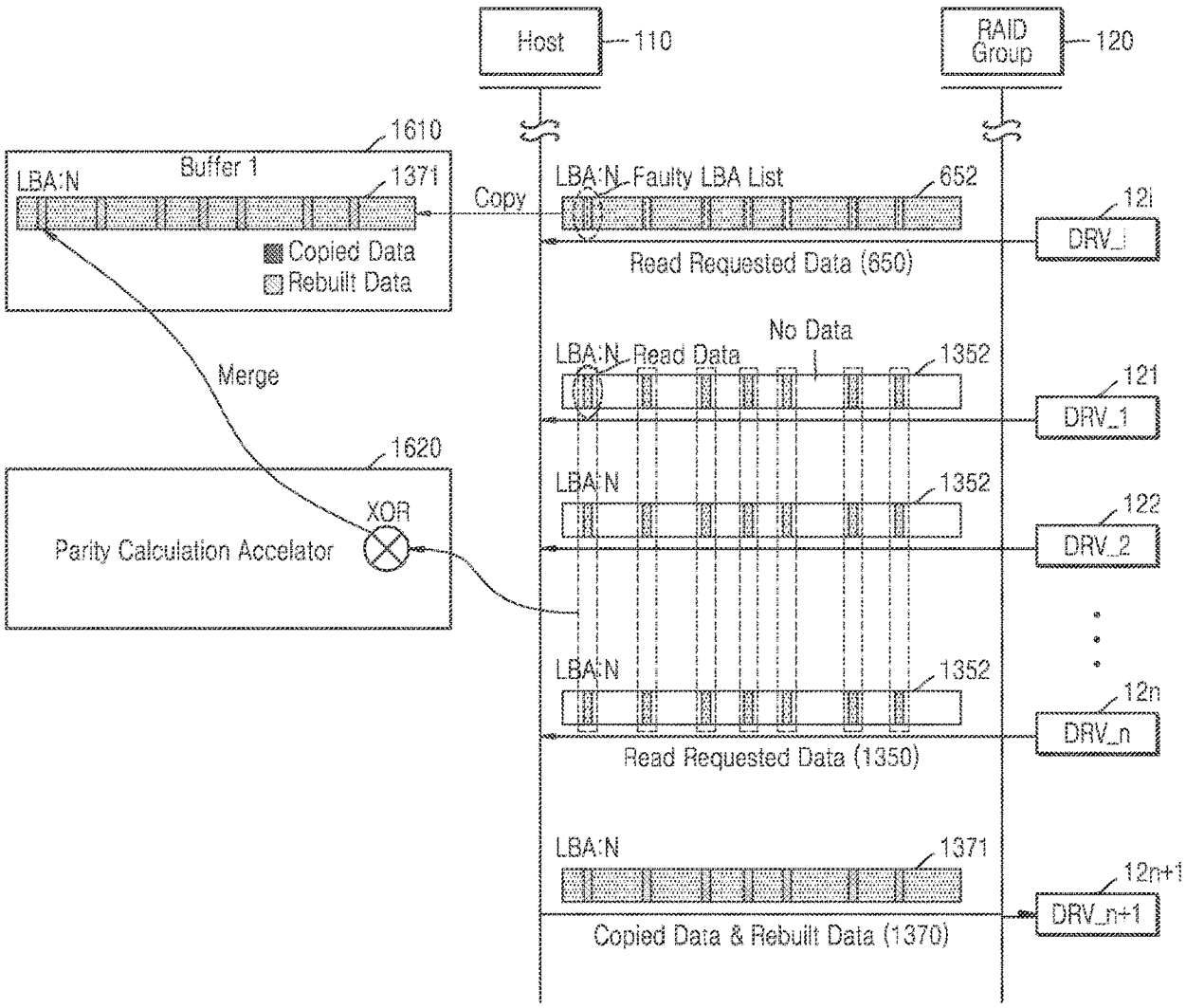
FIG. 16 illustrates a diagram explanatory of a method of rebuilding data according to another embodiment of the inventive concept.

FIG. 16 illustrates a diagram explanatory of a method of rebuilding data according to another embodiment of the inventive concept. Although not shown, operations 610, 620, 630 and 640 shown in and/or described with respect to FIG. 13 may be included in the method of rebuilding data of FIG. 16, but are not shown in FIG. 16 to avoid complexity. The method of rebuilding data of FIG. 16 may thus include similar operations as described with respect to FIG. 13 and FIG. 15, and detailed explanation of such similar operations may be omitted from the following.

Referring to FIG. 16, as compared with FIG. 15, the host 110 may include a parity calculation accelerator 1620 instead of the second buffer 1520. From among the read-requested LBA data 1352 transmitted from the normal data storage devices 121 to 12n (except 12i) at a read-requested LBA, the parity calculation accelerator 1620 may perform an XOR operation on data of the read-requested LBA data 1352 corresponding to regions of the faulty LBA list information of the read-requested LBA data 652, and store rebuilt data, which is obtained as a result of the XOR operation, in a first buffer 1610.

For example, the parity calculation accelerator 1620 may be embodied by a software module, a hardware module, special-purpose hardware (e.g., an application specific integrated circuit (ASIC) and a digital signal processor (DSP)), an embedded controller, and/or an interconnection circuit.

The host 110 may combine in the first buffer 1610 the copied data of normal regions from the read-requested LBA data 652 with the rebuilt data obtained by the parity calculation accelerator 1620. Thus, host 110 may transmit combined data 1371, which is a combination of the copied data of the normal portions from the read-requested LBA data 652 and the rebuilt data of the regions corresponding to the faulty LBA list information, to the spare data storage device 12n+1 (operation 1370). The spare data storage device 12n+1 may store the copied data in portions corresponding to normal portions of the failed data storage device 12i in an LBA (LBA:N), and store the rebuilt data in portions corresponding to failed portions of the failed data storage device 12i.

In the present embodiment, a parity operation may be performed on data of regions corresponding to the faulty LBA list information provided by the normal data storage devices 121 to 12n (except 12i) by using the parity calculation accelerator 1620, and data obtained as a result of the parity operation may be combined with the copied data of normal regions from the read-requested LBA data 652 within first buffer 1610. Thus, it may be unnecessary to allocate an additional memory for the data of regions corresponding to the faulty LBA list information provided by the normal data storage devices 121 to 12n (except 12i).

Figure 17:
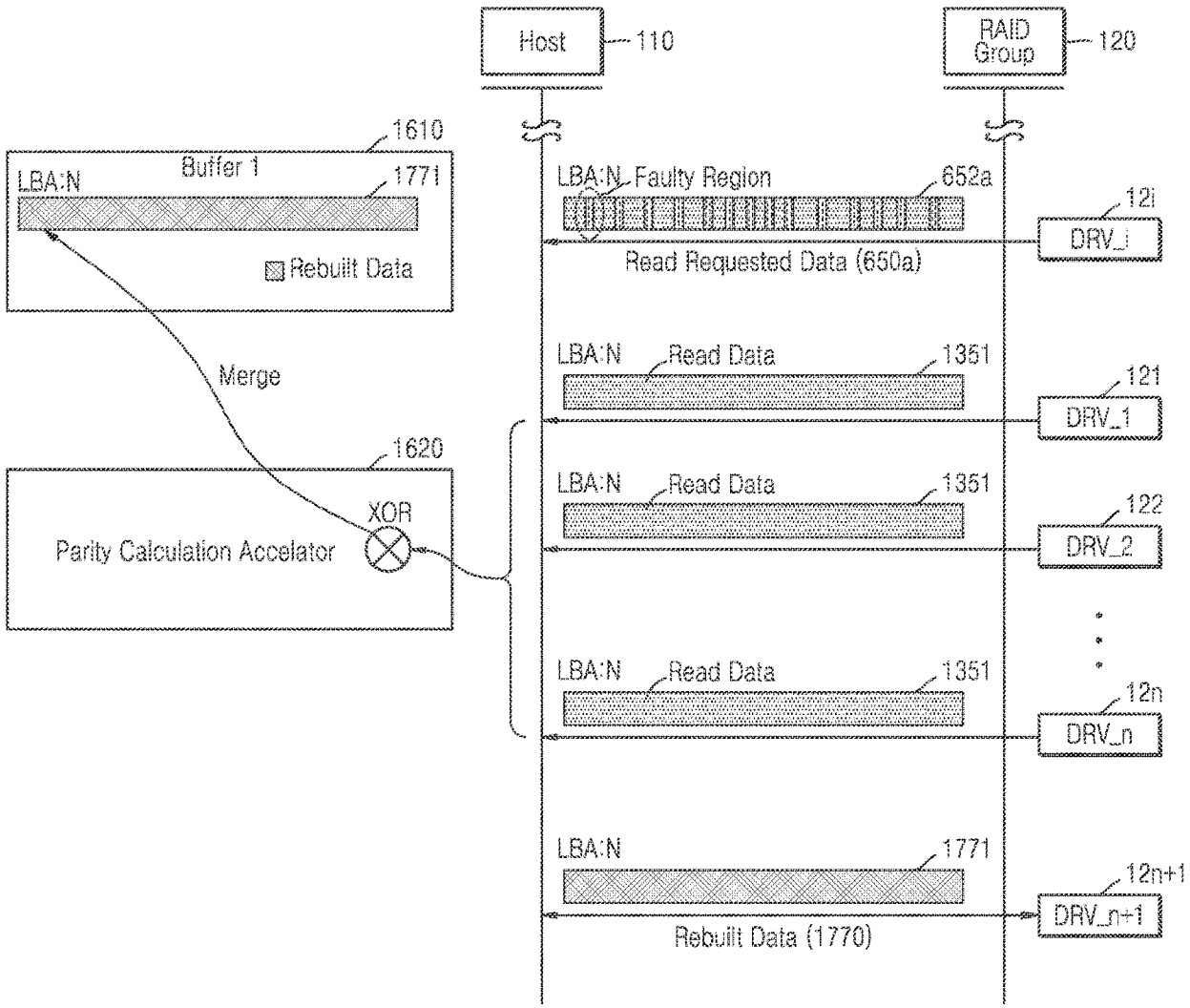
FIG. 17 illustrates a diagram explanatory of a method of rebuilding data according to a still further embodiment of the inventive concept.

FIG. 17 illustrates a diagram explanatory of a method of rebuilding data according to a still further embodiment of the inventive concept. Although not shown, operations 610, 620, 630 and 640 shown in and/or described with respect to FIG. 13 may be included in the method of rebuilding data of FIG. 17, but are not shown in FIG. 17 to avoid complexity. The method of rebuilding data of FIG. 17 may thus include similar operations and/or structure as described with respect to FIG. 13 and FIG. 16, and detailed explanation of such similar operations and/or structure may be omitted from the following.

Referring to FIG. 17, the host 110 may receive read-requested LBA data 652a including faulty LBA list information from the failed data storage device 12i (operation 650a), and may analyze the received read-requested LBA data 652a. The host 110 may determine that the read-requested LBA data 652a includes many faulty LBA regions relative to a predetermined number.

In this case where the host 110 determines that the read-requested LBA data 652a includes many faulty LBA regions relative to the predetermined number, the host 110 may request the entire read data included in the read-requested LBA (LBA:N) from the normal data storage devices 121 to 12n (except 12i). In this case, rebuilding all of the data in the read-requested LBA (LBA:N) of the failed data storage device 12i from all the normal data storage devices 121 to 121n (except 12i) may be more effective than rebuilding data of the faulty LBA regions in the read-requested LBA (LBA:N) from the normal data storage devices 121 to 12n (except 12i).

The host 110 may receive the data 1351, which is read at the read-requested LBA, from the normal data storage devices 121 to 12n (except 12i). The host 110 may drive the parity calculation accelerator 1620 to perform an XOR operation on the read data 1351.

The parity calculation accelerator 1620 may perform an XOR operation on the data 1351 read from the read-requested LBA, and store rebuilt data 1771, which is obtained as a result of the XOR operation, in the first buffer 1610.

The host 110 may transmit the data 1771 rebuilt by the parity calculation accelerator 1620 to the spare data storage device 12n+1 (operation 1770). The spare data storage device 12n+1 may receive the rebuilt data 1771, and store the rebuilt data 1771 at the corresponding LBA (LBA:N).

As described above, a method of handling faulty LBA list information according to embodiments may be applied to a data rebuild operation. Thus, since read-requested LBA data provided to the host 110 includes the faulty LBA list information, the host 110 may reduce the number of read requests due to the data rebuild operation, and reduce a data rebuild time.

While the inventive concept has been particularly shown and described with reference to the embodiments thereof, it will be understood that various changes in form and details may be made therein without departing from the spirit and scope of the following claims.

What is claimed is:

1. [The] *A* method of rebuilding data in a redundant array of independent disks (RAID) device including a plurality of data storage devices, the RAID device connected to a host, the method comprising:

transmitting, by the host, a rebuild request to a failed data storage device from among the plurality of data storage devices;

receiving, by the host, data of a first region and a second region of a read-requested region of the failed data storage device and information regarding the second region in response to the rebuild request from the failed data storage device, wherein the first region is a normal region and the second region is a faulty region, and the information regarding the second region comprises a failed address list that identifies faulty logical block addresses (LBAs) of the read-requested region;

collecting, by the host, the failed address list of the failed data storage device; and rebuilding, by the host, the data of the second region based on the failed address list.

2. The method of claim 1, wherein the receiving of the information regarding the second region comprises receiving sense data provided along with the data of the first region and the data of the second region as the information regarding the second region.

3. The method of claim 1, wherein the receiving of the information regarding the second region comprises receiving information included in a first portion or a last portion of the read-requested region as the information regarding the second region.

4. The method of claim 1, wherein the data of the second region of the read-requested region comprises a predetermined faulty pattern.

5. The method of claim 1, wherein the failed address list comprises faulty logical block address (LBA) list information comprising a total number of the faulty LBAs of the read-requested region, a start address of each of the faulty LBAs, and a block count of each of the faulty LBAs.

6. The method of claim 1, wherein the collecting of the failed address list of the failed data storage device is performed prior to the transmitting of the rebuild request, and the transmitting the rebuild request comprises the host transmitting a read request that prevents transmission of the information regarding the second region from the failed data storage device.

7. The method of claim 1, wherein the rebuilding of the data of the second region based on the failed address list comprises:

copying, by the host, the data of the first region of the failed data storage device and storing the copied data;

receiving, by the host, data of a region corresponding to the second region of the failed data storage device from remaining data storage devices of the plurality of data storage devices other than the failed data storage device, performing a parity operation, and generating rebuilt data; and combining, by the host, the copied data and the rebuilt data, and writing the combined data to a spare data storage device.

8. The method of claim 7, wherein during the rebuilding of the data of the second region, the host does not receive data of a region corresponding to the first region of the failed data storage device from the remaining data storage devices.

9. The method of claim 1, further comprising:

analyzing, by the host, the failed address list;

performing a parity operation by using data of regions corresponding to the first and second regions from remaining data storage devices of the plurality of data storage devices other than the failed data storage device, upon determination by the host based on a result of the analyzing that rebuilding data of the failed data storage device by using the data corresponding to the first and second regions from the remaining data storage devices is more effective than rebuilding the data of the failed data storage device by using the failed address list; and rebuilding data of the failed data storage device based on a result of the parity operation.

10. A redundant array of independent disks (RAID) device comprising a plurality of data storage devices, wherein each of the data storage devices comprises:

a plurality of memories that store data; and a memory controller configured to manage the data in the memories, read the data in the memories in response to an externally provided read request from a host, and transmit the data externally, wherein the memory controller is configured to transmit to the host data of a first region and data of a second region of read-requested data related to an externally provided rebuild request, and transmit to the host failed address list information of the second region, responsive to the externally provided read request, wherein the first region is a normal region and the second region is a faulty region, and the failed address list transmitted by the memory controller identifies faulty logical block addresses (LBAs).

11. The RAID device of claim 10, wherein the memory controller is configured to add the failed address list information to the data of the second region, and transmit the data of the second region including the failed address list information.

12. The RAID device of claim 10, wherein the memory controller is configured to add the failed address list information to sense data provided along with the read-requested data, and transmit the sense data including the failed address list information.

13. The RAID device of claim 10, wherein the memory controller is configured to add the failed address list information to a first portion or a last portion of the read-requested data, and transmit the first portion or the last portion of the read-requested data including the failed address list information.

14. The RAID device of claim 10, wherein the memory controller is configured to mark the data of the second region with a predetermined data pattern, and transmit the data of the second region marked with the predetermined data pattern.

15. A method of rebuilding data in a redundant array of independent disks (RAID) device including a plurality of data storage devices, the method comprising:

transmitting, by a host, a rebuild request to a failed data storage device from among the plurality of data storage devices;

receiving, by the host, data of a first region and a second region of a read-requested region of the failed data storage device and information regarding the second region in response to the rebuild request, wherein the first region is a normal region and the second region is a faulty region;

collecting, by the host, a failed address list of the failed data storage device; and rebuilding, by the host, the data of the second region based on the failed address list, wherein the rebuilding of the data of the second region based on the failed address list comprises copying, by the host, the data of the first region of the failed data storage device and storing the copied data, receiving, by the host, data of a region corresponding to the second region of the failed data storage device from remaining data storage devices of the plurality of data storage devices other than the failed data storage device, performing a parity operation, and generating rebuilt data, and combining, by the host, the copied data and the rebuilt data, and writing the combined data to a spare data storage device.

16. The method of claim 15, wherein the receiving of the information regarding the second region comprises receiving the data of the second region of the read-requested region as the information regarding the second region.

17. The method of claim 15, wherein during the rebuilding of the data of the second region, the host does not receive data of a region corresponding to the first region of the failed data storage device from the remaining data storage devices.

*18. A storage device comprising:*

*a plurality of data storage devices;*

*a memory controller configured to process a rebuild request by performing a sequence of operations including:*

*receiving the rebuild request to rebuild contents of a failed data storage region of a data storage device among the plurality of data storage devices;*

*determining based on the rebuild request for the data storage device having the failed data storage region, to support a data rebuild operation to rebuild the contents of the failed data storage region;*

*based on the rebuild request, providing, to an external device, normal data of the data storage device having the failed data storage region, wherein the normal data is stored in a spare data storage device among the plurality of data storage devices; and*

*based on the rebuild request, providing, to the external device, a failed address list indicating faulty logical block addresses (LBAs) corresponding to the failed data storage region,*

*wherein the memory controller receives the rebuild request from the external device.*

*19. The storage device of claim 18, wherein parity data stored in a first data storage device, among the plurality of data storage devices, provides reliability of data stored in the first data storage device.*

*20. The storage device of claim 18, wherein the normal data of the failed data storage region is rebuilt based on a result of a parity operation.*

*21. The storage device of claim 18, wherein the memory controller identifies a parity data storage device among the plurality of data storage devices which contains parity data corresponding to the data storage device having the failed data storage region.*

*22. The storage device of claim 18, wherein the memory controller adds the failed address list to a first portion or a last portion of a read-requested data, and transmits the first portion or the last portion of the read-requested data including the failed address list.*

*23. A memory system comprising:*

*a plurality of nonvolatile memories: and*

*a controller configured to:*

*receive, from an external device, a rebuild request for a nonvolatile memory having a failed memory region among the plurality of nonvolatile memories;*

*determine, based on receiving the rebuild request for the nonvolatile memory having the failed memory region, to support a data rebuild operation to rebuild contents of the failed memory region;*

*based on the rebuild request, provide, to the external device, normal data of the nonvolatile memory having the failed memory region, wherein the normal data is stored in a spare nonvolatile memory among the plurality of nonvolatile memories; and*

*based on the rebuild request, provide, to the external device, a failed address list indicating faulty logical block addresses (LBAs) corresponding to the failed data storage region.*

*24. The memory system of claim 23, wherein parity data stored in a first nonvolatile memory among the plurality of nonvolatile memories provides reliability of data stored in the first nonvolatile memory.*

*25. The memory system of claim 23, wherein the normal data of the failed memory region is rebuilt based on a result of a parity operation.*

*26. The memory system of claim 23, wherein the plurality of nonvolatile memories include a first nonvolatile memory, a second nonvolatile memory and a third nonvolatile memory.*

*27. The memory system of claim 23, wherein the controller adds the failed address list to a first portion or a last portion of a read-requested data, and transmits the first portion or the last portion of the read-requested data including the failed address list.*

*28. The memory system of claim 23, wherein the controller marks the contents of the failed memory region with a predetermined data pattern, and transmit the contents of the failed memory region marked with the predetermined data pattern.*

*29. The memory system of claim 23, wherein the plurality of nonvolatile memories are flash memories.*

* * * * *